(12) United States Patent
Earl et al.

(10) Patent No.: US 9,787,418 B2
(45) Date of Patent: Oct. 10, 2017

(54) PLUGGABLE TIME SIGNAL ADAPTER MODULES FOR SELECTING A TIME REFERENCE INTERFACE

(71) Applicant: Endace Technology Limited, Hamilton (NZ)

(72) Inventors: David Earl, Hamilton (NZ); Stuart Wilson, Hamilton (NZ)

(73) Assignee: Endace Technology Limited, Hamilton (NZ)

( * ) Notice: Subject to any disclaimer, the term of this patent is extended or adjusted under 35 U.S.C. 154(b) by 357 days.

(21) Appl. No.: 14/484,170

(22) Filed: Sep. 11, 2014

(65) Prior Publication Data

US 2016/0072602 A1    Mar. 10, 2016

Related U.S. Application Data

(60) Provisional application No. 62/048,098, filed on Sep. 9, 2014.

(51) Int. Cl.
| | |
|---|---|
| *G06F 1/04* | (2006.01) |
| *G06F 1/12* | (2006.01) |
| *H04J 3/06* | (2006.01) |
| *H04L 12/10* | (2006.01) |
| *G06F 21/34* | (2013.01) |
| *H04L 29/06* | (2006.01) |

(52) U.S. Cl.
CPC ............ *H04J 3/0697* (2013.01); *H04L 12/10* (2013.01); *G06F 21/34* (2013.01); *H04L 63/0876* (2013.01); *H04L 63/123* (2013.01)

(58) Field of Classification Search
CPC ......... G06F 1/12; G06F 21/34; H03L 7/0807; H04L 7/0337; H04L 69/08; H04L 41/046; H04L 63/0876; H04L 63/123

USPC .................................................. 713/500, 600
See application file for complete search history.

(56) References Cited

U.S. PATENT DOCUMENTS

| | | | | |
|---|---|---|---|---|
| 2009/0257354 A1* | 10/2009 | Hannel | ................. | H04J 3/0697 370/241 |
| 2014/0355986 A1* | 12/2014 | Trojer | .................... | H04Q 11/00 398/49 |

FOREIGN PATENT DOCUMENTS

WO    2014/049511 A1    4/2014

OTHER PUBLICATIONS

"Further Examination Report"; Apr. 8, 2016; New Zealand App. No. 631269; 3 pages.

(Continued)

*Primary Examiner* — Michael J Brown
(74) *Attorney, Agent, or Firm* — Alford Law Group, Inc.; William E. Alford

(57) ABSTRACT

A small form-factor pluggable (SFP) time signal adapter module includes a printed circuit board, a cable connector mounted to the printed circuit board, and a differential receiver coupled to the cable connector, one or more of the plurality of wire traces, and an SFP edge connector. The printed circuit board has a plurality of wire traces and a plurality of pads of the SFP edge connector is at least coupled to two of the plurality of wire traces. The cable connector is coupled to at least one or more of the plurality of wire traces. The cable connector coupes to a connector of a cable to receive a differential time reference signal. The differential receiver receives and differentiates the differential time input signal to generate a single ended time reference signal that is coupled to a pad of the SFP edge connector.

19 Claims, 18 Drawing Sheets

(56) References Cited

OTHER PUBLICATIONS

Solarflare SFN6322F Dual-Port 10GbE SFP+ Onload Precision Time Synchronization Server Adapter—Part ID: SFN6322F published on the internet at: http://www.colfaxdirect.com/store/pc/viewPrd.asp?idproduct=1576#details first indexed by Google on Jun. 28, 2012; 2 pages.

* cited by examiner

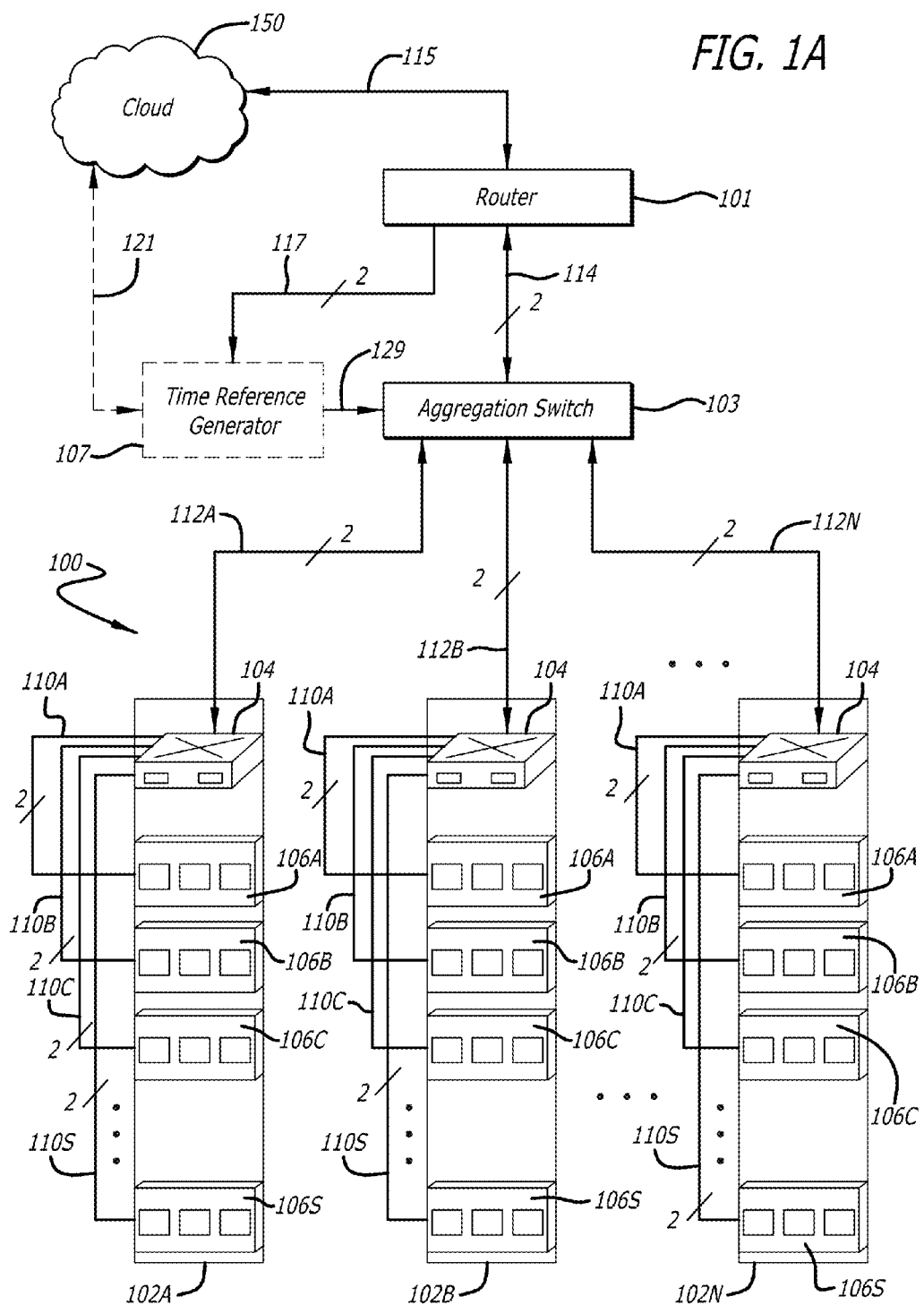

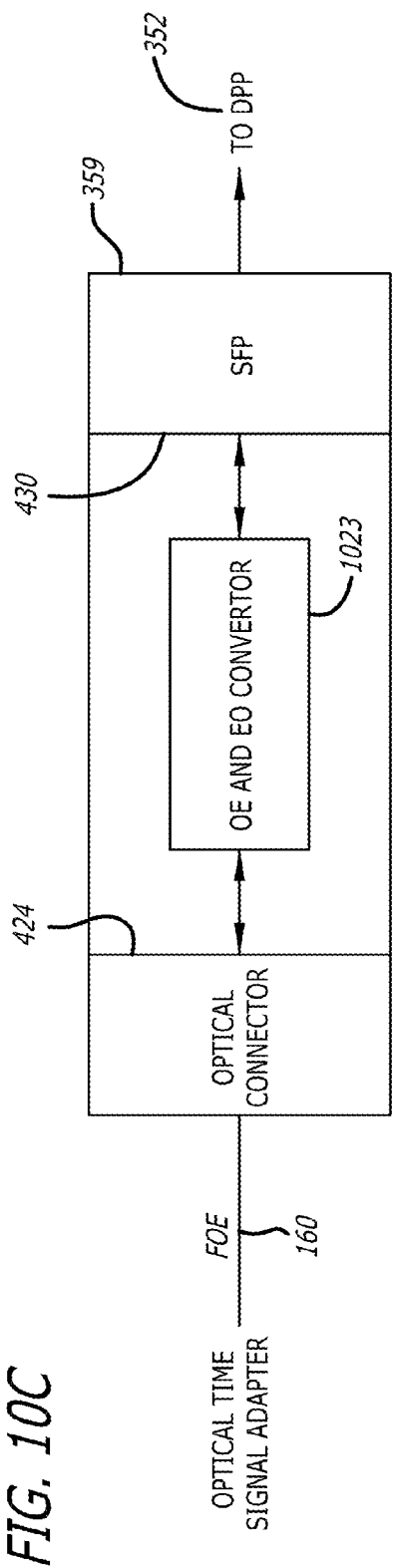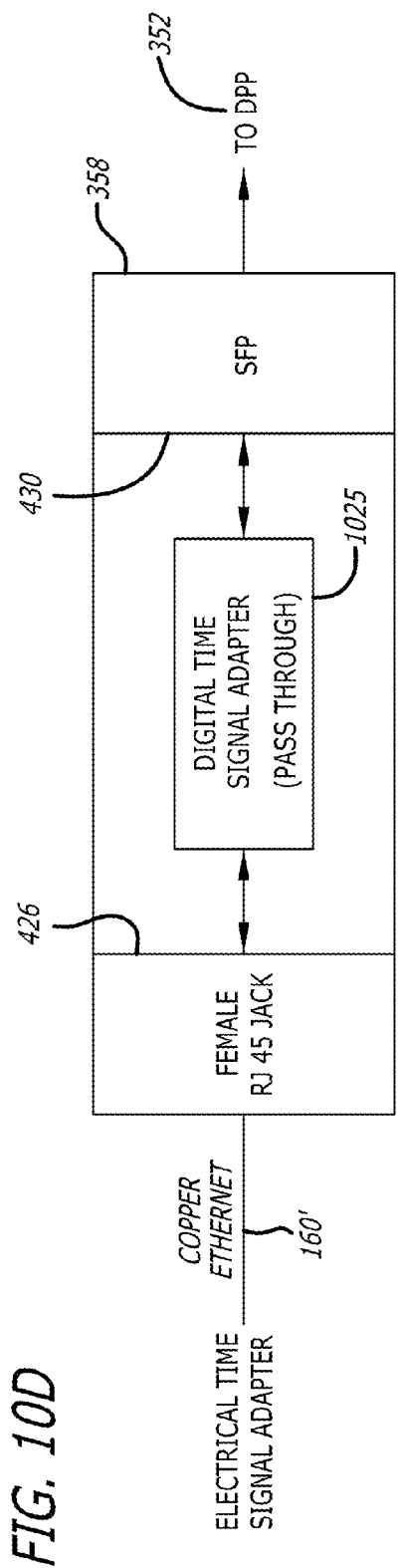

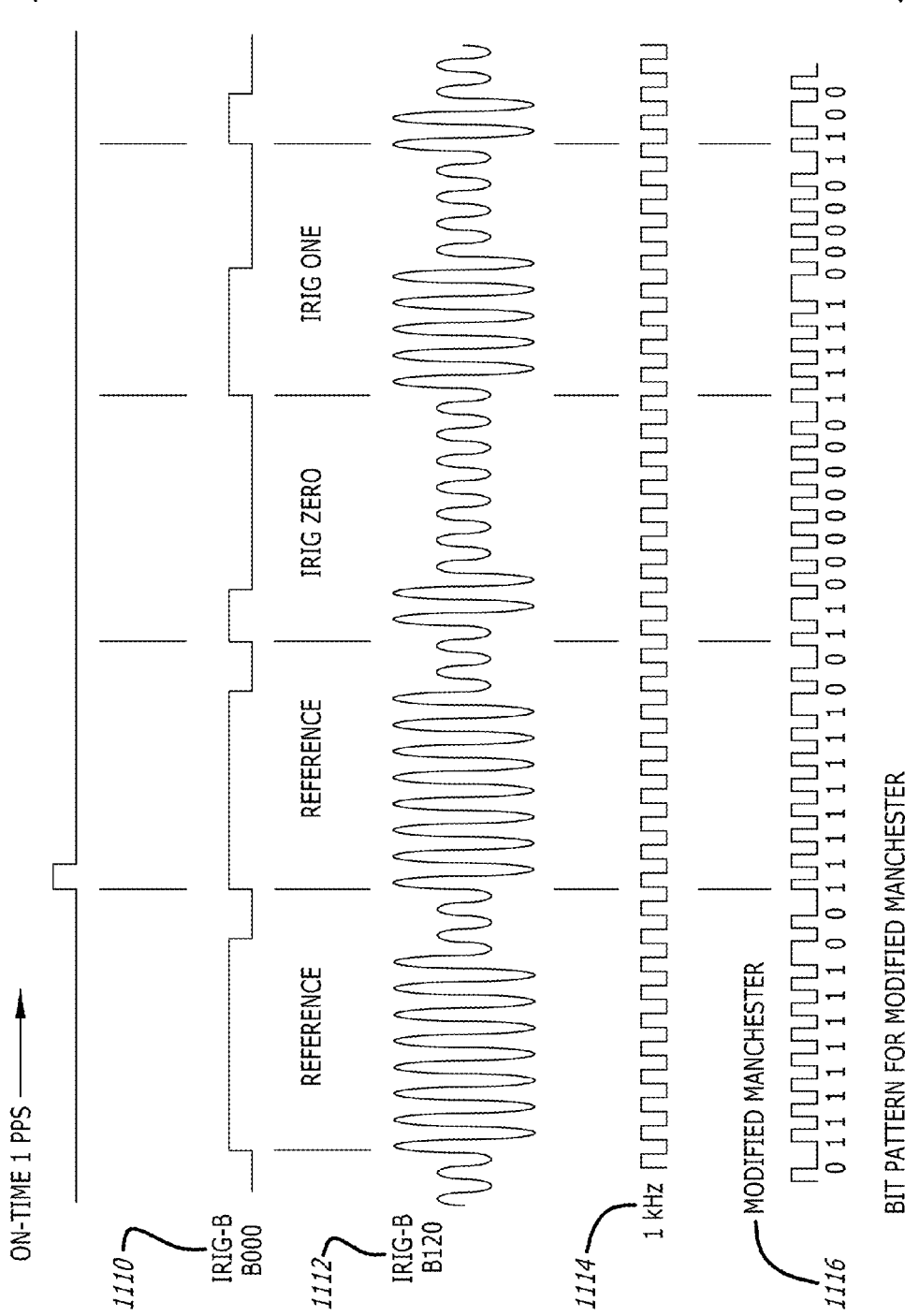

PLUGGABLE TIME SIGNAL ADAPTER MODULES FOR SELECTING A TIME REFERENCE INTERFACE

CROSS REFERENCE

This patent application claims the benefit of U.S. Provisional Patent Application No. 62/048,098 entitled PLUGGABLE TIME SIGNAL ADAPTER MODULES FOR SELECTING A TIME REFERENCE INTERFACE filed on Sep. 9, 2014 by inventors David Earl et al. This patent application is related to New Zealand Patent Application No. 631269 entitled PLUGGABLE TIME SIGNAL ADAPTER MODULES FOR SELECTING A TIME REFERENCE INTERFACE filed on Sep. 11, 2014 by inventors David Earl et al., that claims priority to U.S. Provisional Patent Application No. 62/048,098 filed on Sep. 9, 2014.

FIELD

The embodiments generally relate to time reference signal interconnection to networking equipment.

BACKGROUND

Networking equipment often has internal clocks to indicated date and time for files and other information. However, date and time of internal clocks may not be accurate for some applications. It is often desirable for networking equipment to have a more accurate date and time.

A time reference signal may be used to provide a more accurate date and time to networking equipment. The type of time reference signal and the means of communicating the time reference signal to networking equipment can vary. Certain networking equipment may receive one type of time reference signal over a wire cable, for example. Other networking equipment may receive a different time reference signal over an optical cable, for example. Integrating the different networking equipment with different types of time reference signals into a network can be challenging.

It is desirable to provide a flexible approach to communicating time reference signals to networking equipment.

BRIEF SUMMARY

The embodiments are summarized by the claims that follow below.

BRIEF DESCRIPTIONS OF THE DRAWINGS

FIG. 1A is a block diagram of a networking system with a plurality of equipment racks having networking equipment and a time reference generator.

FIG. 10C is a block diagram of an SFP time signal adapter module for receiving optical time reference signals over optical network cable.

FIG. 10D is a block diagram of an SFP time signal adapter module for receiving packetized time signals over wire network cable.

FIG. 11B are waveform diagrams to illustrate a modulated time signal.

DETAILED DESCRIPTION

Figure 1B:
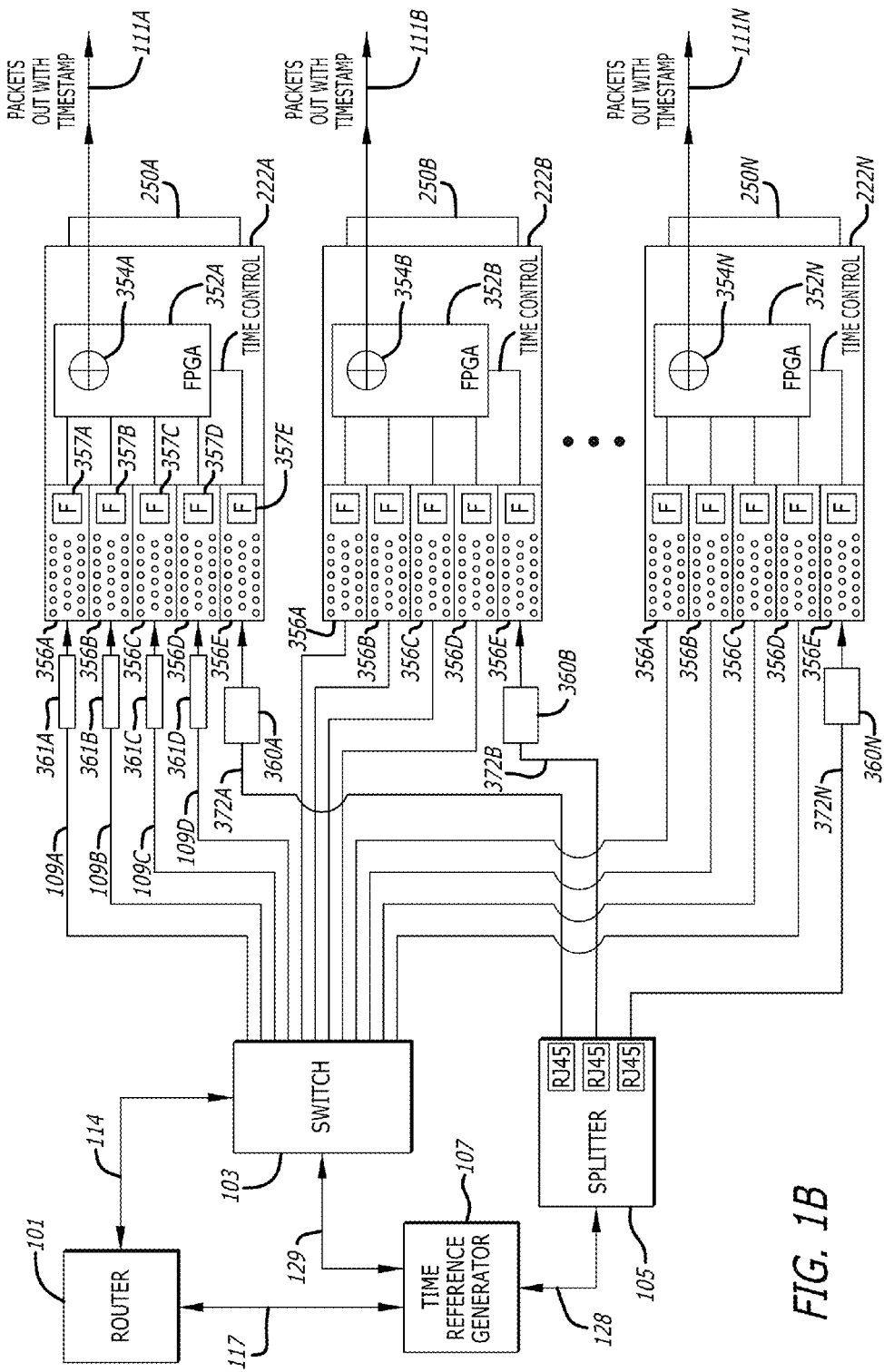
FIG. 1B is a block diagram of a portion of a networking system illustrating a time reference generator from which a time reference signal propagates through a splitter and over dedicated cables to networking equipment.

In the following detailed description of the embodiments, numerous specific details are set forth in order to provide a thorough understanding. However, it will be apparent to one skilled in the art that the embodiments may be practiced without these specific details. In other instances well known methods, procedures, components, and circuits have not been described in detail so as not to unnecessarily obscure other aspects.

Methods, apparatus and systems are disclosed for selectively interfacing different time signals to network equipment in a storage area network. Time reference signals may be of different protocols (e.g., Ethernet, IRIG-B) and different signal types such as analog, digital, optical, and electrical signals. One of a plurality of SFP time signal adapter modules can be selected to interface a time signal with one of the various protocols and one of the signal types to a printed circuit board card with a time signal port so that the time reference signal can be received.

Signal control and time stamp referencing in high speed communication connections between networked equipment may be used to manage the synchronization of the signals transmitted and received in a local area network. High speed networked devices that form communication links with ten gigabit per second data rates can make the synchronization of signals more challenging. It may be desirable to synchronize or time stamp (with a date and time) various forms of signals generated by the various types of system infrastructure such as analog, optical, Ethernet or a combination thereof. Providing a flexible way for networking equipment to support the various forms of signals is desirable. A synchronizing time reference signal may be communicated in various networks by using different forms of signals.

As demand for higher data rates has increased, there has been a desire to use high speed communication connections between various networking equipment. Small form pluggable (SFP) transmitter/receivers have become popular due to the demands for high speed communication connections within a local area network. Various SFP module configurations can be used with a daughter card to support the various forms of signals that may be used within a local area network. The daughter card and its integrated circuit(s) can process the signals to provide time stamps and synchronization. It is desirable to lower costs and provide more flexible options when providing a plurality of high speed data connections between network equipment.

Local Area Networks with Time Reference Signals

Referring now to FIG. 1A, a block diagram of a networking system 100 is illustrated. The networking system 100 includes a plurality of equipment racks 102A-102N, a router 101, a time reference generator 107, and an aggregation switch 103. The aggregation switch 103 couples the networking system 100 to the router 101 by a redundant interconnection 114. The router 101 is coupled to the internet 150 or other wide area network by interconnection 115.

The time reference generator 107 is coupled to the router 101 by a redundant interconnection 117 and to the aggregation switch 103 by redundant interconnection 129. The time reference generator 107 may optionally communicate with the internet 150 by interconnection 121 for periodic communication with an external timekeeping resource. The time reference generator 107 may periodically communicate with an external timekeeping resource to synchronize and validate its own clock mechanism and baseline timekeeping resources. Various time reference generators 107 may be used in a network and generate various time signals that are distributed through the local area network. Additional connections may be made to the time reference generator 107 to distribute a time signal to the various networking equipment.

Each equipment rack 102A-102N includes networking equipment, such as network switches, keyboard, video, and mouse (KVM) switches, storage area networking (SAN) devices, and servers in whatever format, such as tower servers, rack servers, or blade servers. For example, in FIG. 1, each equipment rack 102A-102N includes one or more servers 106A-106S coupled to a rack switch 104. Each rack switch 104 of each equipment rack 102A-102N is coupled to the aggregation switch 103 by interconnection 112A-112N.

Servers often provide a high performance centralized computer to which client computers may communicate for information exchange and/or to execute software applications. For example, a server may execute a backup application and backup the data of client computers periodically to a SAN device. Servers may be located locally to client computers in communication over a local area network (LAN) or remotely in communication over a wide area network (WAN), such as the internet. SAN devices provide data storage using one or more types of media formats. Network switches provide the switching fabric between servers and SAN devices and a gateway to the wide area network.

Redundant cables 112A-112N provide the long distance high speed data connection between each rack switch 104 and the aggregation switch 103. High volume cables 110A-110S, couple the one or more networking equipment in each rack to the rack switch 104. The cable connections 110A-110S are redundant as well, for reliability, in case one or the other cable connection becomes faulty, and to allow for load balancing between the redundant connections.

In one embodiment, the one or more servers 106A-106S are legacy equipment, with each server having a small form pluggable (SFP) connector to receive an SFP plug or SFP cable connector from the cables 110A-110S. In an embodiment, the one or more servers 106A-106S are updated to include a cable connector, replacing the SFP connectors. In the case of legacy equipment, a legacy equipment adaptor may be provided and plug into the SFP connector of the legacy equipment to couple to cable plugs or connectors of the cables 110A-110S.

Various time reference generators may be used within a local area network that generate different signal types of a synchronizing time reference signal. For example, the time reference generator may packetize the time signal within an Ethernet packet for distribution throughout the local area network with optical signals and electrical signals. Alternatively, a time signal may be directly distributed to networking equipment by using an unmodulated differential data signal or a modulated differential data signal, for example.

Network Coprocessing Daughter Cards

Referring now to FIG. 1B, a block diagram of a portion of a networking system in a local area network is shown. The portion of the networking system includes the time reference generator 107, the router 101, the switch 103, a signal splitter 105, and a plurality of network coprocessing daughter cards 222A-222N coupled together as shown. The plurality of network coprocessing daughter cards 222A-222N may be installed into a motherboard of one or more of a plurality of networking equipment. Each network coprocessing daughter card 222A-222N may receive data signals and a time reference signal.

Figure 11A:
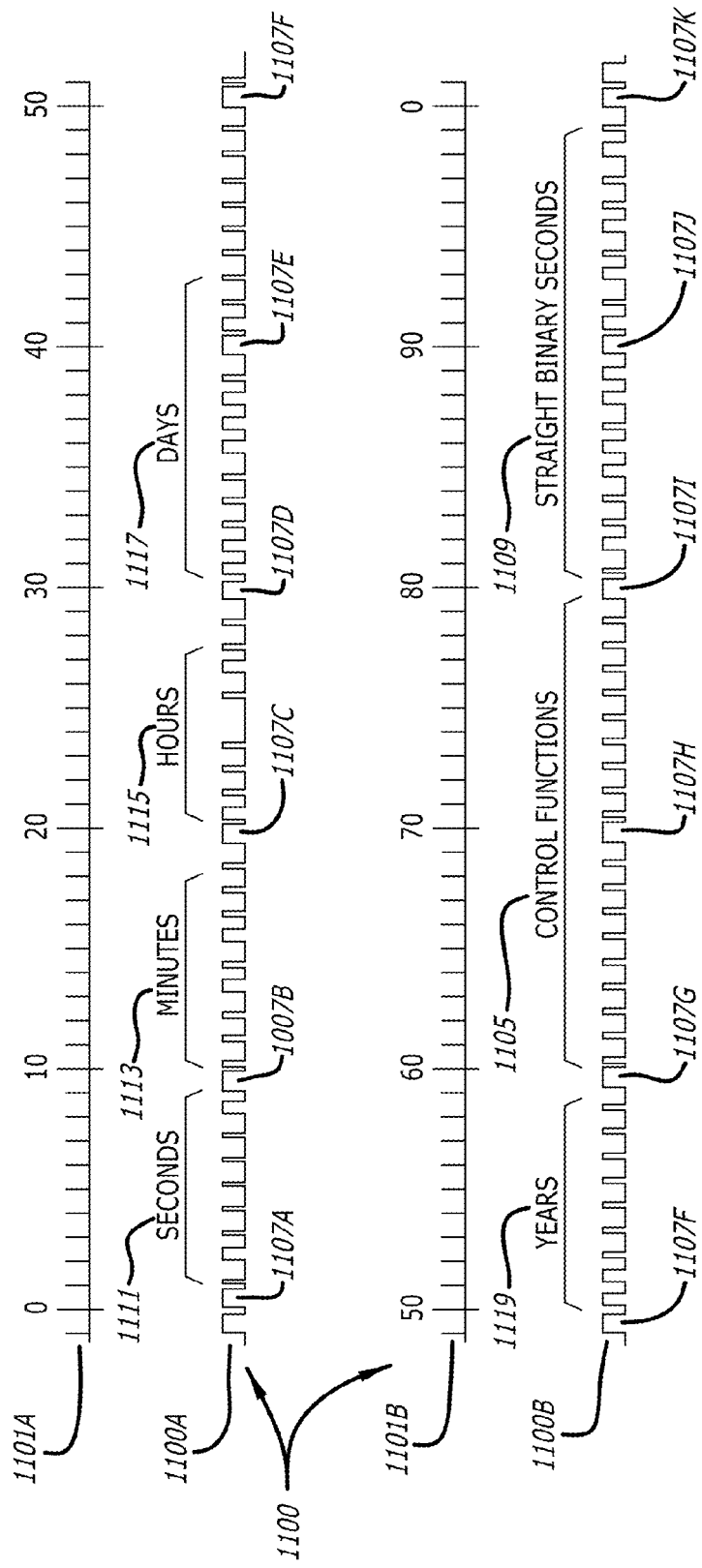
FIG. 11A is a detailed waveform diagram illustrating components of a time signal.

In some embodiments, the time reference generator 107 generates a time reference signal that is directly distributed to the network equipment in the local area network. In some embodiments, the time reference signal is a differential standard IRIG-B time signal that may provide one signal pulse per second (PPS). FIG. 11A illustrates details of a standard IRIG-B time reference signal. A differential data signal is a true and inverted signal or a positive and negative time signal. In another embodiment, the time reference signal is a modulated differential standard IRIG-B time reference signal. FIG. 11B illustrates how a standard IRIG-B time reference signal may be modulated.

The time reference generator 107 is coupled to the router by interconnection 117. The time reference generator 107 may optionally be coupled to the switch 103 by interconnection 129. The time reference generator 107 is coupled to a signal splitter 105 by interconnection 128. The signal splitter 105 is coupled to the network coprocessing daughter card 222A-222N by cables 372A-372N, SFP time signal adapter modules 360A-360N, and their respective connectors. The SFP time signal adapter modules 360A-360N are coupled into a time signal port 356E of each packet processing daughter card 222A-222N. A dedicated SFP time signal port 356E for the time reference signal is used in this case due to the time reference signal being a different type of signal than that being received at the data signal ports 356A-356D. A dedicated SFP time signal port 356E also avoids interfering with the volume of data packet traffic expected through the SFP data signal ports 356A-356D.

In one embodiment, the cables 372A-372N are Ethernet cables with male RJ45 connectors at each end. In this case, the signal splitter 105 has RJ45 female sockets into which the mail RJ45 connectors at one end of the Ethernet cables 372A-372N can plug into. The SFP time signal adapter modules 360A-360N have RJ45 female sockets into which the male RJ45 connectors at the opposite end of the Ethernet cables 372A-372N can plug into. Male SFP edge connectors of the SFP time signal adapter modules 360A-360N are coupled into respective female SFP edge connectors 357E in SFP EMI cages of the time signal ports 356E of the network coprocessing daughter card 222A-222N.

The time reference signal propagates from the time reference generator 107 to the signal splitter 105. The signal splitter 105 splits the time reference signal so that it is multiplexed out towards the plurality of network coprocessing daughter cards 222A-222N over the cables 372A-372N. The split time reference signals from the cables 372A-372N are coupled into the SFP time signal adapter modules 360A-360N. The split time reference signal from the cables are processed by the SFP time signal adapter modules 360A-360N into SFP signal levels and coupled into the PCB cards 222A-222N. The SFP time signal adapter modules 360A-360N may convert a differential serial data signal into a non-differential serial data signal with SFP compatible signal levels. In embodiments, the SFP time signal adapter modules 360A-360N may demodulate a modulated time reference signal into a non-modulated time reference signal. In any case, the SFP time signal adapter modules 360A-360N receive and process the split time reference signals from the splitter 105. In one embodiment, the split time reference signal is an IRIG-B standard time reference signal clocked at one pulse per second time signal input from the splitter 105.

Data signal packets propagate to the PCB cards 222A-222N to be processed by one or more pieces of network equipment in the local area network. Data signal packets flow from the router 101 to the switch 103 over redundant Ethernet cables 114. The switch 103 reads the IP address and may route the data signal packets to the network equipment to which it is addressed. The switch 103 may also route copies of data signal packets in a load balanced manner to each of the PCB cards 222A-222N in network equipment (e.g., one or more of equipment 106A-106S in one or more racks 102A-102N in FIG. 1A) over cables 109A-109D. In one embodiment, the cables 109A-109N are Ethernet cables with RJ-45 male connectors coupled to each end. In one embodiment, the PCB cards 222A-222N include female RJ-45 sockets to receive the mail RJ-45 connectors. In an embodiment, the PCB cards 222A-222N include SFP data ports 356A-356D with female SFP sockets 357A-357D to receive SFP data signal adapter modules 361A-361D (collectively SFP data signal adapter modules 361).

Figure 1C:
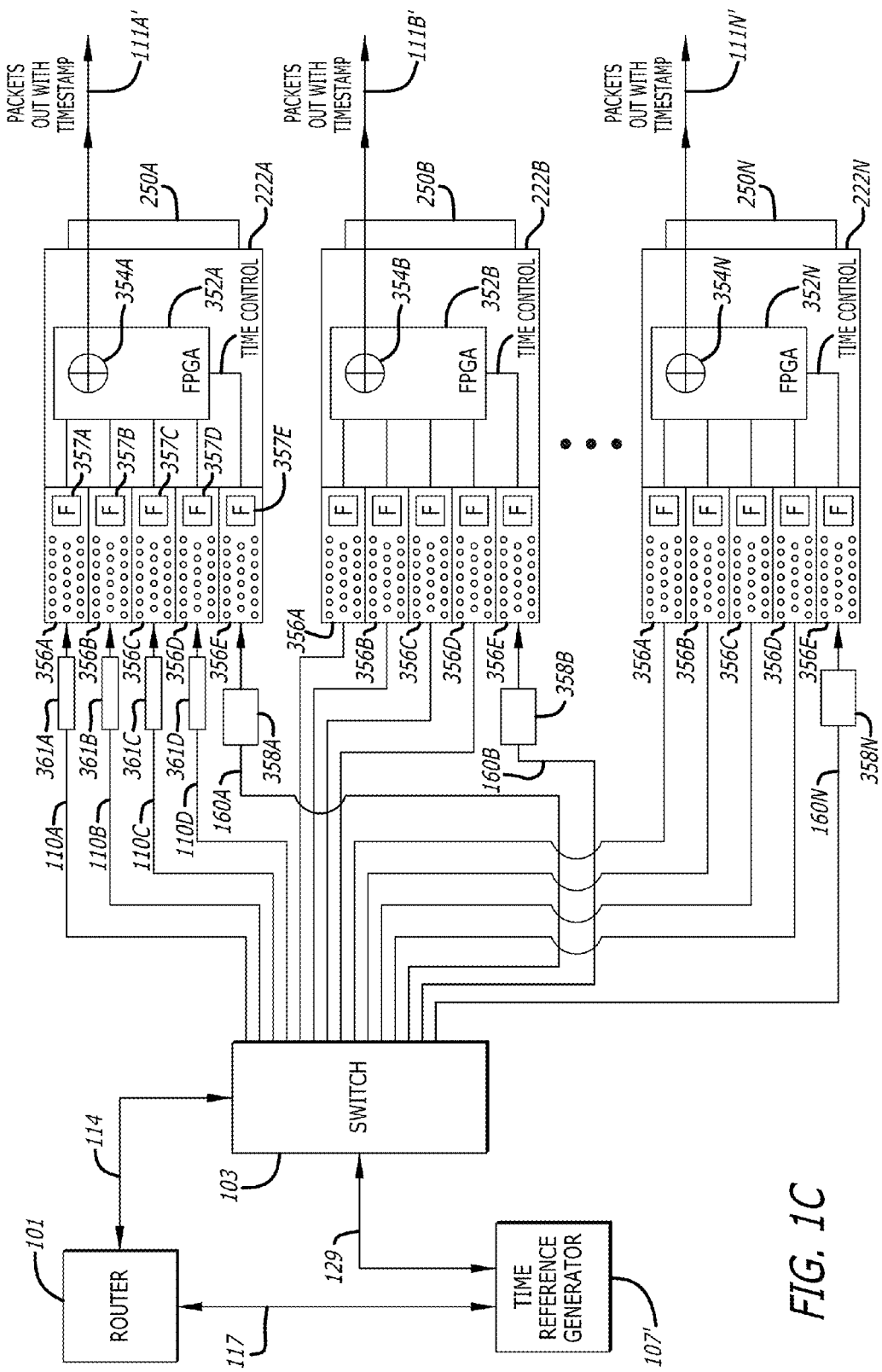
FIG. 1C is a block diagram of a portion of a networking system illustrating a time reference generator that packetizes a time reference signal into an Ethernet packet to form a time reference signal packet that is then propagated through switches and cables to networking equipment.

FIGS. 1B-1C show SFP data signal adapter modules 361A-361D ready to plug into the female SFP sockets 357A-357D and SFP data ports 356A-356D of the daughter card 222A. The SFP data signal adapter modules 361A-361D are already plugged into female SFP sockets 357A-357D and SFP data ports 356A-356D of the daughter cards 222B-222N.

In one case, the SFP data signal adapter modules 361A-361D (collectively referred to by reference number 361 herein) include SFP optical sockets at one end to receive SFP optical plugs of optical cables 109A-109D. In another embodiment, the SFP data signal adapter modules 361 include female RJ-45 electrical sockets at one end to receive the male RJ-45 electrical connectors of electrical cables 109A-109D. Each of the SFP data signal adapter modules 361 include a male SFP edge connector for plugging into the female SFP edge connectors 357A-357D mounted to the PCBs 222A-222N within SFP EMI cages of the SFP data ports 356A-356D. Whether cables 109A-109B are electrical cables or optical cables, data signal packets without a received time stamp are carried between the switch 103 and the SFP data signal adapter modules 361A-361D.

The SFP data signal adapter modules 361 process the data packets into data signals. Data signals from the SFP data signal adapter modules 361 and a time reference signal from one of the SFP time signal adapter modules 360A-360N (collectively referred to by reference number 360), are communicated to a data packet coprocessing circuit 352A-352N on each network coprocessing daughter card 222A-222N. The data packet coprocessing circuits 352A-352N are mounted to the daughter cards 222A-222N and coupled to the female SFP edge connectors 357A-357E by traces of the printed circuit board. The data packet coprocessing circuits 352A-352N may be flexibly implemented by a field programmable gate array (FPGA).

The data packet processing circuit 352A-352N receives the time reference signal and the data signals in serial form from the respective modules 360 and 361A-361D on each card 222A-222N. The data packet processing circuit 352A-352N may have a serializer/deserializer (SERDES) to deserialize the date and time reference data of the serial signal into a parallel form. For any acknowledgement or control signal to be sent back to the time reference generator 107, the SERDES of the data packet processing circuit 352A-352N may serialize a data signal for packetizing and transmitting/transmission back to the time signal reference generator 107.

In response to the time reference signal, the data packet coprocessing circuit 352A-352N adds a date and a time (collectively referred to as a time stamp) to the data in the data packet as they are received by each of the daughter cards 222A-222N. Time stamp logic 354A-354N (or time stamp instructions, in the case of software) in each data packet processing circuit 352A-352N adds the date and time as a time stamp to the data packet.

With a date and a time (collectively referred to as a time stamp) associated with the data in the data packets, the data may be further processed by the data packet processing circuit 352A-352N and/or the networking equipment (e.g., servers 106A-106S) in which one or more of the daughter cards 222A-222N may reside. The data and associated time stamp may be output from the daughter cards 222A-222N as a digital output signal 111A-111N through a PCB edge connector 250A-250N for further processing by the server. The daughter cards may also packetize the data and associated time stamp together back into a time stamped data packet, such as an Ethernet packet, and communicate it to other networking equipment within the local area network.

A time reference generator may be used within a local area network that generates a different signal type for a synchronizing time reference signal. A time reference generator may packetize the time signal within an Ethernet packet for distribution throughout the local area network with optical signals and/or electrical signals. The *Standard* for a *Precision Clock Synchronization Protocol for Networked Measurement and Control Systems* published by the Institute of Electrical and Electronic Engineers as IEEE 1588 standard, introduced a precision time protocol (PTP) that was used to synchronize clocks throughout a computer network.

Referring now to FIG. 1C, a portion of a networking system is illustrated with a time reference generator 107' that packetizes a time reference signal into an Ethernet packet to form a time reference signal packet. The time reference signal packet can then be broadcast into the local area network through one or more switches 103, interconnections/cables 129, 160A-160N, and SFP time signal adapter modules 358A-358N to the SFP time signal ports 356E of the daughter cards 222A-222N in the various networking equipment. In this case, a dedicated SFP time signal port 356E for time reference signal packets may be desirable to avoid interfering with the expected volumes of data packet traffic through the SFP data signal ports 356A-356D.

The portion of the networking system illustrated in FIG. 1C includes the router 101, the time reference generator 107', and the switch 103 coupled together by interconnections or cables 114, 117, 129. Interconnections or cables 160A-160N may be used to couple together the switch 103 and SFP time signal adapter modules 358A-358N and carry the time reference signal packets between each. Interconnections or cables 110A-110D, for example, may be used to couple together the switch 103 and SFP data signal adapter modules 361A-361D of each card 222A-222N and carry the data signal packets between each.

The cable 129 and/or cables 160A-160N may be wire Ethernet cables for transmission of time reference signal packets via electrical signals or fibre optic cables for transmission of time reference signal packets via optical signals. In one embodiment, the cables 160A-160N are Ethernet cables with RJ-45 male connectors attached to both ends of the cables. In this case, the SFP time signal adapter modules 358A-358N include female RJ-45 sockets at one end to receive the male RJ-45 connectors of electrical cables 160A-160N. In another embodiment, the cables 160A-160N are fibre optical cables with SFP optical connectors at each end. In this case, the SFP time signal adapter modules 358A-358N include SFP sockets at one end to receive SFP plugs of optical cables 160A-160N. Whether optical or electrical signals, each of the SFP time signal adapter modules 358A-358N include a male SFP edge connector for plugging into the female SFP edge connectors 357E mounted to the PCBs 222A-222N within SFP EMI cages of the SFP time signal port 356E. In either case, with a time reference signal packet, the SFP time signal adapter modules 358A-358N may be similar to SFP data signal adapter modules 361A-361D for the corresponding cable type.

The SFP time signal adapter modules 358A-358N may receive the time reference signal packets, depacketize, and extract the date and time reference data therein. The date and time reference data may be serially coupled into the data packet processing circuit 352A-352N of each daughter card 222A-222N. The data packet processing circuit 352A-352N may have a serializer/deserializer (SERDES) to deserialize the date and time reference data into a parallel form for time stamping the data in data packets.

With a time stamp (including date and time) associated with the data in the data packets, the data may be further processed by the data packet processing circuit 352A-352N and/or the networking equipment (e.g., servers 106A-106S) in which one or more of the daughter cards 222A-222N may reside. The data and associated time stamp may be output from the daughter cards 222A-222N as a digital output signal 111A'-111N' through a PCB edge connector 250A-250N for further processing by one or more of the servers 106A-106S. The data and associated time stamp may be packeted together into a data packet, such as an Ethernet packet, and communicated to other networking equipment within the local area network.

Figure 2:
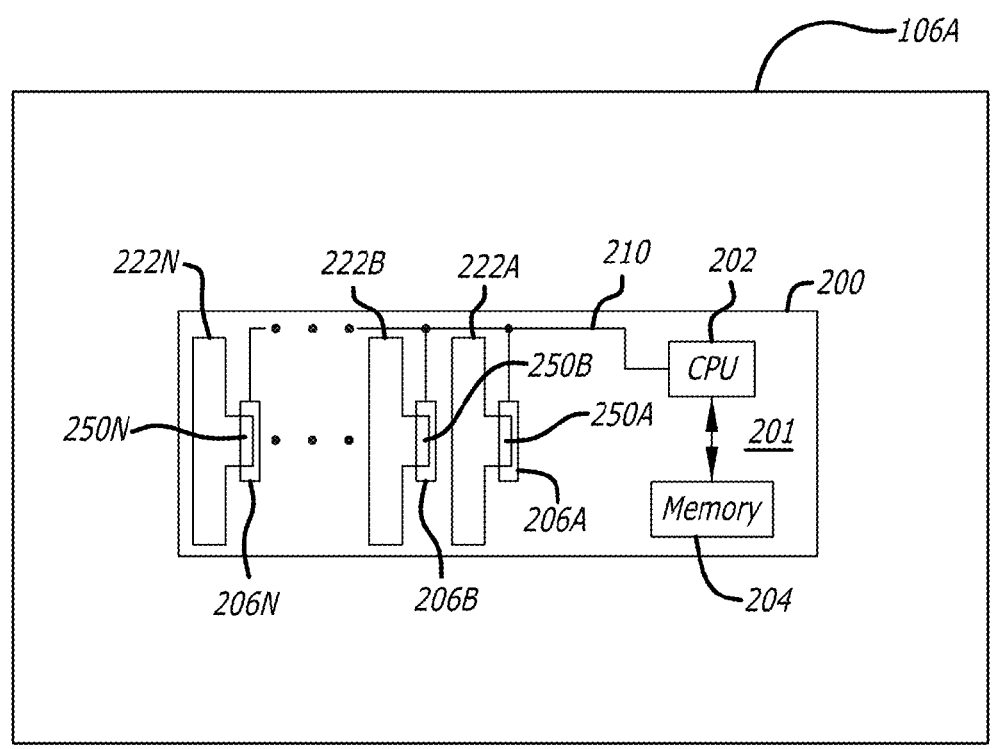
FIG. 2 is a block diagram of a server with a plurality of daughter cards with one or more of the daughter cards receiving a time reference signal.

Referring now to FIG. 2, a block diagram of one piece of networking equipment 106A (e.g., a server) is illustrated. The networking equipment 106A includes a motherboard 200 with a microprocessor 202, a memory 204, and a plurality of card connectors 206A-206N coupled together by conductive wire traces 210 of a printed circuit board 201. The edge connector 250A-250N of one or more networking daughter cards 222A-222N may be plugged into one or more card connectors 206A-206N. In one embodiment, the daughter cards 222A-222N may be peripheral component interconnect express (PCIe) cards having a PCIe bus with a PCIe edge connector 250A-250N that plugs into a PCIe socket 206A-206N.

Flexible Time Signal Adaptation

Figure 3A:
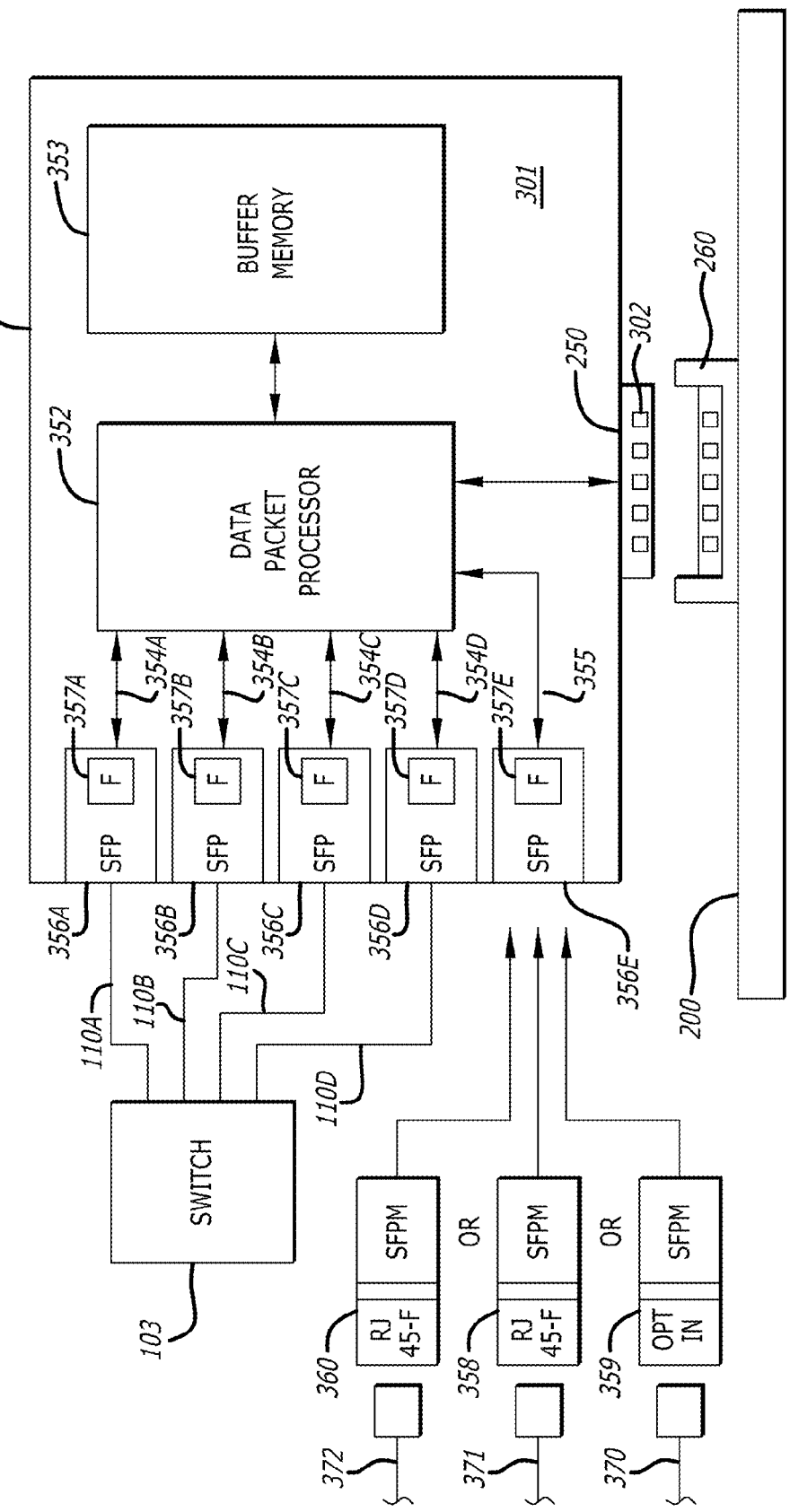
FIG. 3A is a diagram of a daughter card with a plurality of small form-factor pluggable (SFP) ports with one SFP port being used to receive a time reference signal.
Figure 3B:
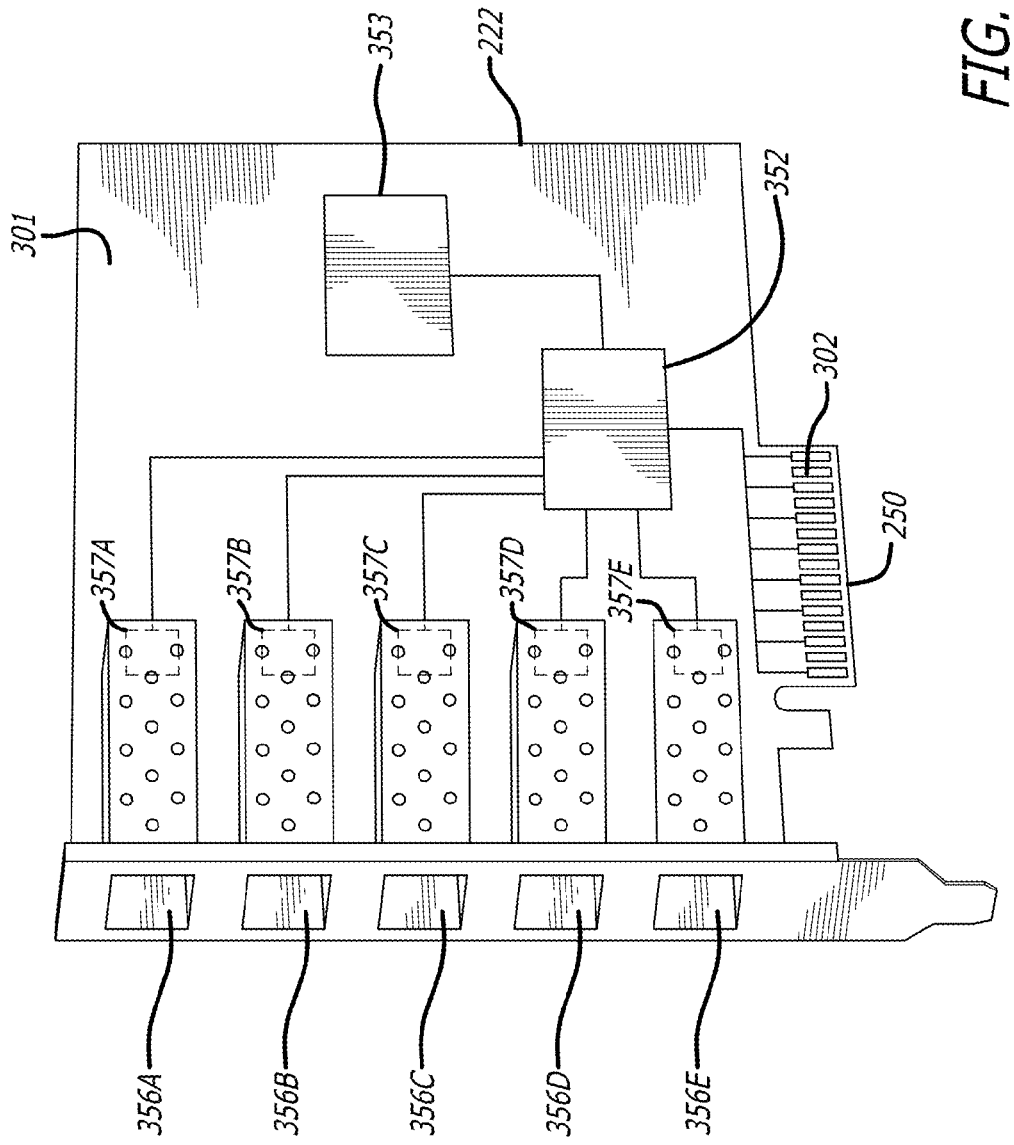
FIG. 3B is a perspective view of a daughter card with SFP ports including female SFP sockets and EMI cages mounted thereto in a column near an edge.

Referring now to FIGS. 3A-3B, a networking daughter card 222 is illustrated having an edge connector 250 that is pluggable into a socket 260 of the motherboard 200 of the networking equipment. The networking daughter card 222 further includes a printed circuit board 301 with the data packet processing circuit 352, a buffer memory 353, SFP data ports 356A-356D, and an SFP time port 356E coupled together by wire traces 354A-354D,355 of the printed circuit board. The networking daughter card 222 may alternatively be referred to as a networking card, networking coprocessor card, or network coprocessing card.

In one embodiment, the data packet processing circuit 352 is a field programmable gated array (FPGA). In some embodiments, the buffer memory 353 is a random access memory (RAM). Each of the SFP ports 356A-356D,356E includes a female SFP connector 357A-357E coupled to the respective wire traces 354A-354D,355 and an SFP EMI cage mounted over the female SFP connector. The data signals are coupled to the data packet processing circuit 352 by the wire traces 354A-354D. The time reference signal is coupled to the data packet processing circuit 352 by the wire traces 355.

The edge connector 250 of the card 222 includes a plurality of pads 302. The pads 302 of the edge connector 250 couple to the pads or pins of the female socket 260 of the system 200 motherboard. The data packet processing circuit 352 and the buffer memory 353 are coupled to the pads 302 of the edge connector 250. In this manner, signals can be routed between the system motherboard 200 and the daughter card 222. With the daughter card 222 pluggable into the edge connector 250 of the mother board, it can be unplugged and removed from the networking equipment so that a failing daughter card can be replaced or the daughter card can be updated to a newer design.

The SFP data signal ports 356A-356D of the daughter card 222 receive the SFP data signal adapter 361A-361D (e.g., see FIG. 1B). As shown in FIG. 3A, the SFP time signal port 356E receives one of a plurality of different types of SFP time signal adapters modules 358,359,360 (e.g., see FIGS. 10A-10D).

One of a plurality of different SFP time signal adapter modules 358-360 can be plugged into the SFP time signal port 356E and its SFP connector 357E. The different SFP time signal adapter modules 358-360 are configured to receive the different time stamped reference signals that are generated by different time reference generators (e.g., see generators 107,107' of FIG. 1B-1C). The one SFP time signal adapter module may be selected by being compatible with the type of time reference signal generated by the time reference generator 107,107' of FIGS. 1B and 1C.

Upon selection of the SFP time signal adapter module at a physical interface level, a software driver may be used thereafter to configure each daughter card in the networking equipment, such as daughter card 222 of FIG. 3A, at a logical interface level to receive the respective time reference signal from the selected SFP time signal adapter module. Accordingly, a software driver executed by the networking equipment in which it resides, may configure the data packet processing circuit 352 and the daughter card 222 to the type of SFP time signal adapter module and the time reference signals that are to be received. The buffer memory 353 or other storage device on the card 222 may be used to store initialization/management/control software that is executable with the data packet processing circuit 352 to configure the circuit. Alternatively with reference to FIG. 2, memory 204 of the motherboard 200 may store the software and be executed by the processor 202 to configure the respective cards 222A-222N.

Instead of forming a custom daughter card for each of the different types of time reference signals, the various SFP time signal adapter modules can be used to flexibly adapt the daughter card 222 to the time reference generator 107,107' (FIGS. 1B and 1C) that is available in the local area network. In this manner, each daughter card (such as daughter card 222 of FIG. 3A) and the networking equipment into which it is installed can be backwardly and forwardly compatible with the various types of time reference signals to be received from the various time reference generators.

The various SFP time signal adapter modules further allow each daughter card and networking equipment to be made in advance, regardless of the time signal generator that may be already resident or selected for use in a local area network. Thus, the one or more daughter cards 222A-222N and the networking equipment in which they are resident can be ready and waiting for orders and then delivered more quickly to a customer in response to the order.

The data packet processing circuit 352 may have circuits and/or execute software to process the data packets and associate a date and time stamp with the data of each data packet that is received over the data signal ports. With the data being associated with the time stamp, it may then be further processed by the networking equipment in the local area network.

A time reference signal may be internally generated by networking equipment. However, an internally generated time reference signal may not be as accurate as an external time reference signal. Moreover, if a plurality of networking equipment is utilized within a local area network, the internally generated time reference signal is likely to be out of synchronization with an internally generated time reference signal of another piece of networking equipment in the same local area network. Accuracy of a time reference signal, and date and time stamp associated with data packets, may be improved by using a time reference signal generator and an externally generated time reference signal that is broadcast or split to each of a plurality of networking equipment. However, it may be desirable to make a daughter card flexible with the capability of receiving internal time reference signals or external time reference signals and the various types of each.

Figure 4:
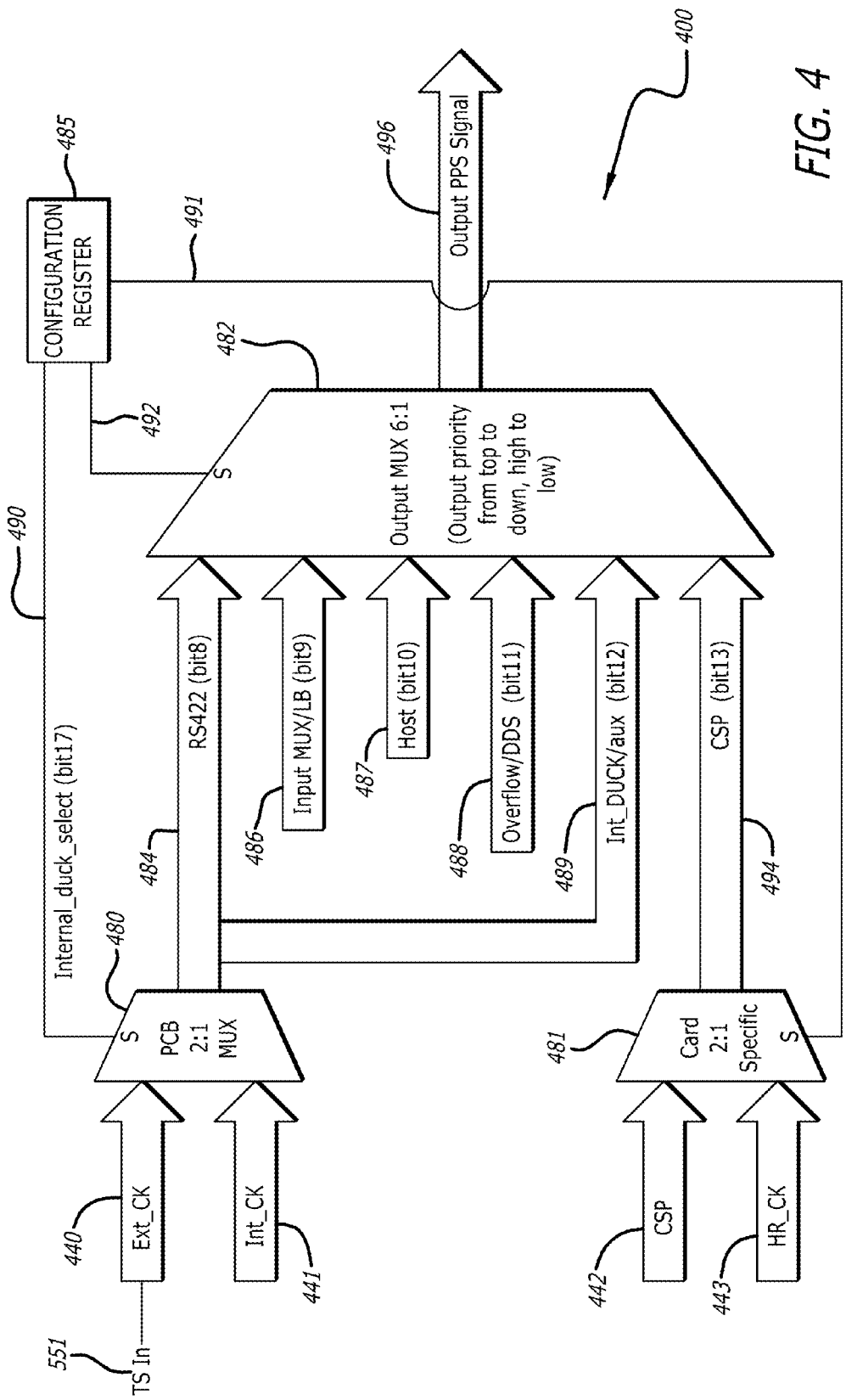
FIG. 4 is a functional block diagram of a time signal selection circuit to select one of a plurality of time reference signals that may be used by the daughter card to synchronize the networking equipment and time stamp data packets.

Referring now to FIG. 4, a diagram of time signal selection logic 400 in the data packet processing circuit 352 is shown. In some embodiments, the signal selection logic is implemented by a field programmable gate array (FPGA). The time signal selection logic 400 includes a plurality of multiplexers (MUX) 480-482, and a configuration register 485 coupled together. The configuration register 485 generates control or selection signals that are coupled into a control or selection input of each MUX 480-482 for controlling what input signal each MUX 480-482 selects to output. The time signal selection logic 400 provides more flexibility in the daughter card 222 so that it can receive internal time reference signals or external time reference signals.

A plurality of time reference signals 440-443 may be coupled into the time signal selection logic 400. An external time reference signal 440 and a first internal time reference signal 441 are coupled into the input of the multiplexer 480 for selection. The external time reference signal (EXT_CK) 440 is the time reference signal from the selected SFP time signal adapter module. The first internal universal time reference signal (INT_CK) 441 is a backward compatible time reference signal that may be selected so that the card 222 can be used as a replacement card. A card specific internal time reference signal (CSP) 442 and a high resolution internal time reference signal (HR_CK) 443 are coupled into the inputs of the multiplexer 481 for selection. The card specific internal time reference signal (CSP) 442 is a backward compatible time reference signal that may be selected so that the card 222 can be used as a replacement card. The high resolution internal time reference signal (HR_CK) 443 is a second internal universal time reference signal with a higher resolution of time than that of the first internal universal time reference signal (INT_CK) 441. The high resolution internal time reference signal (HR_CK) 443 is a newer time reference signal that may be selected so that the card is forward compatible and is used as a new card 222 in newer networking equipment.

The output 484,489 of the two to one multiplexer 480 is coupled into one or two inputs of the output multiplexer 482. The output 494 of the two to one multiplexer 481 is coupled into another input of the output multiplexer 482. The output multiplexer 482 may have further inputs to receive other signals 486-488 when a time reference signal is unnecessary. In one embodiment, the output multiplexer 482 is a six to one multiplexer. In another embodiment, the output multiplexer 482 is a two to one multiplexer receiving the outputs 484 and 494 as two inputs. An output 496 from the multiplexer 482 is the output from the time signal selection logic 400. In response to the select signal 492, the output 496 from the multiplexer 482 selectively outputs the selected time reference signal that is used by the data packet processing circuit 352 of FIG. 3A to associate the date and time of the time stamp to data packets.

The output selection of the desired time reference signal is selected by the configuration register 485. Time reference selection signals 490-492 generated by the configuration register 485 are respectively coupled into the select inputs (S) of the multiplexers 480-482. With the selection of the desired time reference signal, a software driver may write to the configuration register 485 at runtime during initialization of the networking equipment to generate the time reference selection signals 490-492. The various time reference signals that are selectable may generate one or fewer pulses per second (PPS). In another case, the various time reference signals that that are selectable may generate one or fewer pulses per second (PPS).

Small Form Pluggable Time Signal Adapter

Figure 10A:
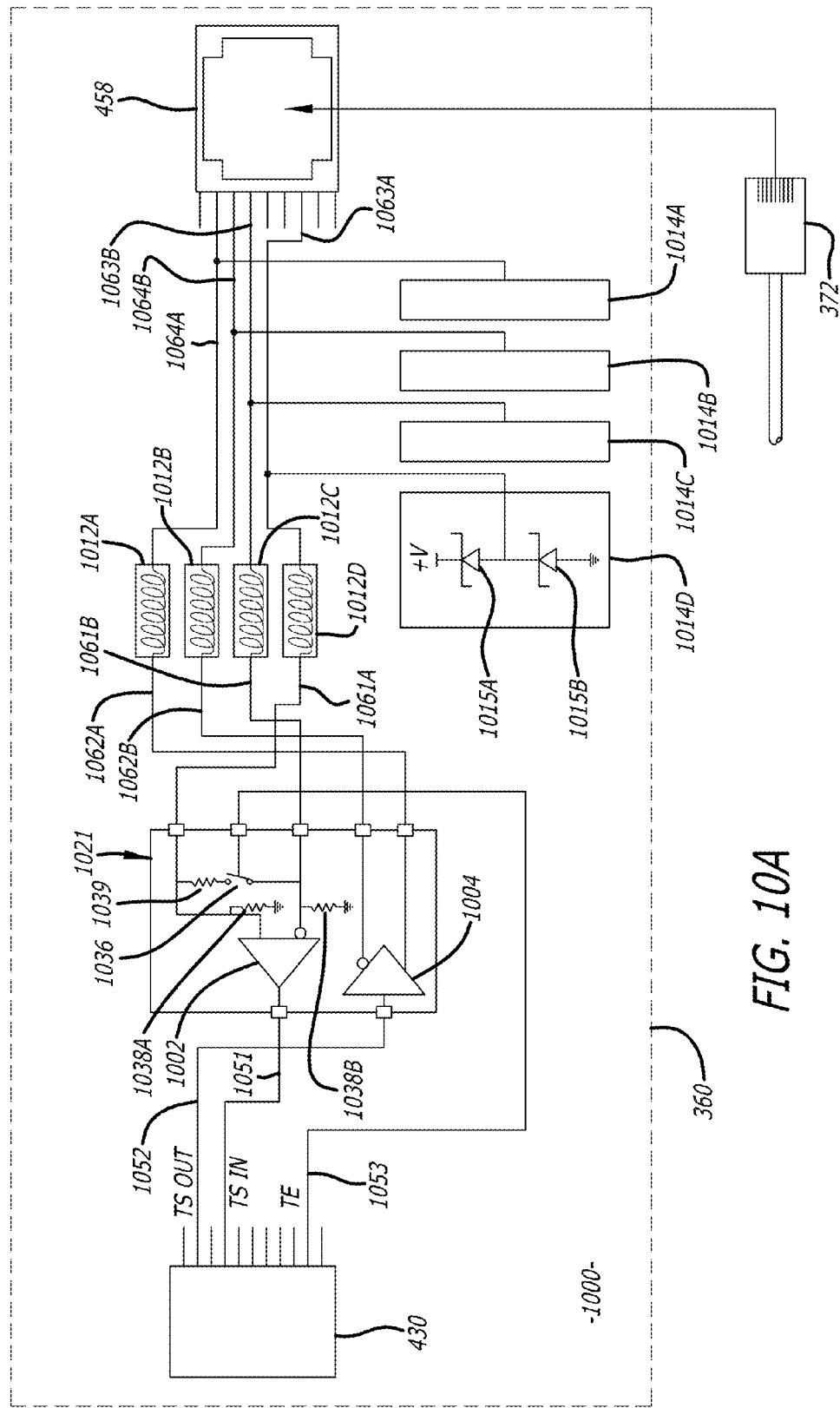
FIG. 10A is a schematic diagram of an SFP time signal adapter module for differential time signals over a serial differential cable.

Referring now to FIG. 10A, a schematic diagram of an SFP time signal adapter module 360 is shown. The SFP time signal adapter module 360 includes a differential receiver transmitter 1021, a cable connector 458 (e.g., an RJ-45 female connector), and an SFP edge connector 430 coupled together as shown. Conductive wire traces of a printed circuit board 1000 couple these elements together. The SFP time signal adapter module 360 further includes inductive filters 1012A-1012D coupled between respective differential signal lines 1061A-1061B, 1062A-1062B and differential signal lines 1063A-1063B,1064A-1064B. The SFP time signal adapter module 360 further includes protection circuits 1014A-1014D coupled to the differential signal lines 1063A-1063B,1064A-1064B.

The differential receiver transmitter 421 includes a differential receiver 1002 and a differential driver 1004. The differential receiver transmitter 421 further includes input resistors 1038A-1038B coupled to the differential signal input terminals of the differential receiver 1002. The input resistors 1038A-1038B help establish the input impedance of the differential receiver 1002 to ground. The differential receiver transmitter 421 further includes a terminating resistor 1039 coupled in series with a transistor switch 1036. In response to the termination enable signal TE 1053, the terminating resistor 1039 is selectively coupled between the differential inputs of the differential receiver 1002 by a transistor switch 1036. The terminating resistor 1039, when selected, establishes an input impedance between the differential signal input terminals of the differential receiver 1002.

The SFP time signal adapter module 360 receives a differential time reference signal from a cable 372 plugged into the cable connector 458. The differential time reference signal is generated by a time reference generator, such as the time reference generator 107 shown in FIG. 1B. In some embodiments, the differential time reference signal is a digital clock signal that is generated in accordance with the IRIG-B time standard. In one embodiment, the digital clock signal that is used for synchronization is generated at a rate of one pulse per second. The rate may be greater than or less than one pulse per second in other embodiments.

The differential time reference signal is then processed through protection devices 1014C-1014D and filtered through filtering devices 1012C-1012D. If the voltage level of a differential signal goes above the positive voltage supply of the SFP time signal adapter module, then the zener diode 1015A in the input protection devices 1014A-1014D should clamp the voltage to a diode turn on voltage above the positive voltage supply. If the voltage level of a differential signal goes below the negative or lower voltage supply of the SFP time signal adapter module, e.g., ground or zero volts, then the zener diode 1015B in the input protection devices 1014A-1014D should clamp the voltage to a diode turn on voltage below the negative or lower voltage supply.

The filtering devices 1012C-1012D are inductive filtering devices to filter out high frequency noise and allow the clamped differential time reference signal to pass through to the differential receiver 1002 and the input/terminating resistors.

With the differential time reference signal at its differential input signal lines 1062A-1062B, the differential receiver 1002 converts the differential signal into a single ended time reference signal (TS OUT) at its output 1051. The single ended time reference signal is coupled to a pad of the SFP edge connector 430.

The daughter card 222 manages the selection of the terminating resistor 1036 and provides a termination enable control signal (TE). The termination enable control signal (TE) is coupled to a pad of the SFP edge connector 430 becoming the TE control signal 1053 that controls the transistor switch 1036.

The daughter card 222 may further send out a time signal output (TS OUT) representative of the time reference signal. The TS OUT signal may be sent back to the time reference generator 107. In this case, it may be used to acknowledge the receipt of the time reference signal input from the time reference generator 107. In another case, a daughter card 222 may further send out a time signal output (TS OUT) that is to be input into other daughter cards 222 that are in close proximity, such as the same server. In this case, the TS OUT signal allow daisy chaining of the time reference signal into other daughter cards (222) to preserve ports and cabling that may otherwise be required of a switch 103 and a splitter 105.

The time signal output (TS OUT) is coupled into a pad of the SFP edge connector 430 becoming the TS OUT signal 1052. The TS OUT signal 1052 is a single ended non-differential signal. It is desirable to convert it into a differential signal so that it can be sent over the cable 372 and common noise can then be removed at the opposite end. The TS OUT signal 1052 is coupled into the single input (single ended input) of the differential driver 1004.

The differential driver 1004 receives the TS OUT signal 1052 and generates a differential output signal (double ended signal) across its differential output signal lines 1061A,1061B (double ended output).

The differential TS OUT output signal from the differential driver 1004 is coupled into the filtering devices 1012A-1012B. The filtering devices 1012A-1012B are inductive filtering devices to filter out high frequency noise and allow the differential TS OUT signal to pass. After passing through the filtering devices 1012A-1012B, the differential TS OUT signal is clamped by the input protection devices 1014A-1014B. The output from the filtering devices 1012A-1012B are coupled to a terminal of the input protection devices 1014A-1014B. The clamped differential TS OUT signal is then coupled to pins of the cable connector 458.

Accordingly, the SFP time signal adapter module 360 receives a differential serial time reference input signal at the cable connector 458 and coverts it into a single ended serial time reference input signal (TS IN) at the SFP edge connector 430 for coupling into the daughter card 222. The SFP time signal adapter module 360 receives a single ended serial time output signal (TS OUT) at the SFP edge connector 430 from the daughter card 222 and coverts it into a double ended serial time output signal at the cable connector 458 for transmission over the cable 372.

A date and time stamp (collectively referred to as a timestamp) is encoded into the single ended serial time reference input signal (TS IN). The single ended serial time reference input signal (TS IN) at the SFP edge connector 430, a digital clock signal, is then deserialized and decoded by the data packet processor to add a date and time stamp to the data packets that are received by the daughter card 222.

Figure 10B:
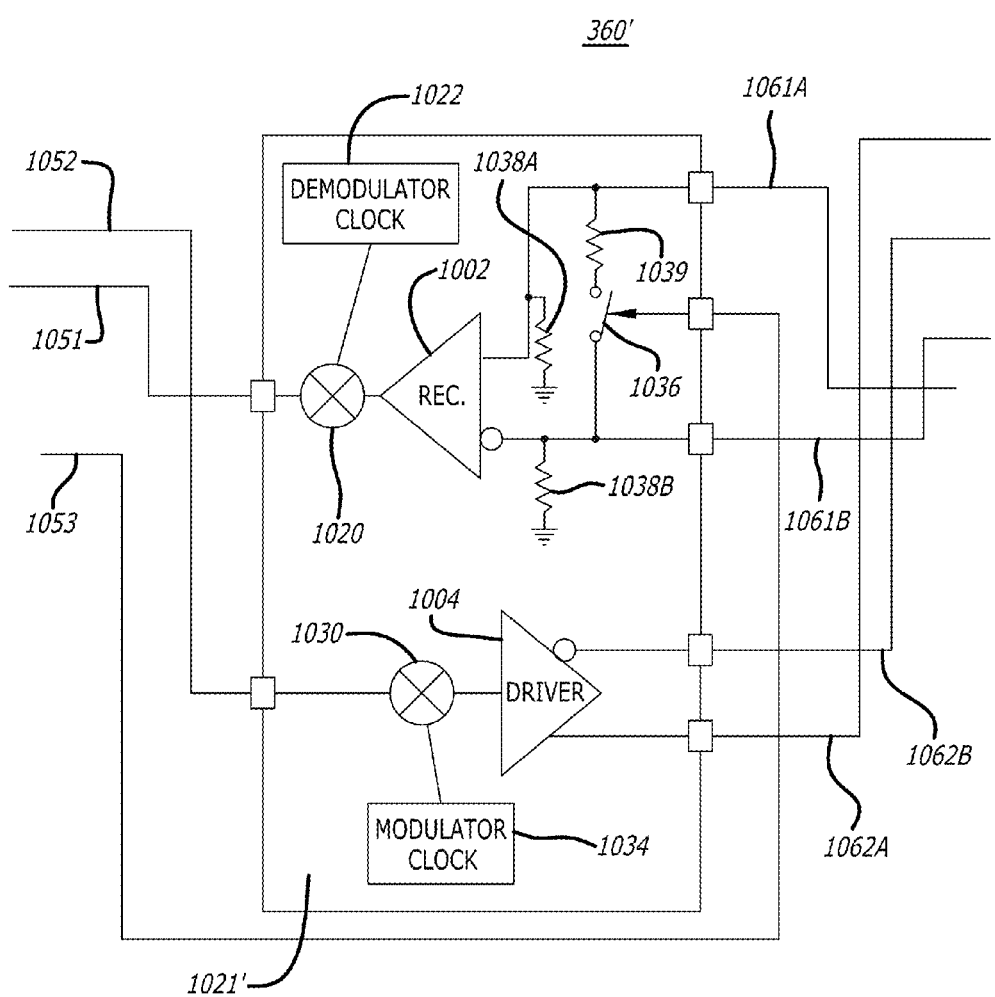
FIG. 10B is a schematic diagram of a differential receiver-transmitter circuit for an SFP time signal adapter module receiving/transmitting modulated time signals over a cable.

Referring now to FIG. 10B, an alternate differential receiver transmitter 1021' is illustrated for an alternate time SFP time signal adapter module 360'. The alternate differential receiver transmitter 1021' is for receiving/transmitting modulated serial differential time signals over the cable 372 of FIG. 10A (the cable 372 is not shown in FIG. 10B). The alternate differential receiver transmitter 1021' of FIG. 10B includes the elements of the differential receiver transmitter 1021 described herein in relation to FIG. 10A. The alternate differential receiver transmitter 1021' of FIG. 10B further includes a demodulating clock source 1022, a modulating clock source 1034, and mixers 1020,1030.

The modulating clock source 1034 generates a local oscillating signal that is coupled into the mixer 1030 to modulate the serial time output signal 1052. The modulated time output signal is coupled into the differential driver 1004 to convert it from a single ended signal to a differential signal. The demodulation clock source 1022 generates a local oscillating signal that is coupled into the mixer 1020 to demodulate a modulated serial time input signal from the differential receiver 1002 to generate the serial time input signal 1051. The frequency of the demodulation clock 1022 should be the same frequency of the modulating clock at the opposite end of the communication channel. The frequency of the modulation clock 1034 should be the same frequency of the de-modulating clock at the opposite end of the communication channel.

Referring now to FIG. 10C, a block diagram of an optical Ethernet SFP time signal adapter 359 is shown. The optical Ethernet SFP time signal adapter 359 includes an electro-optical signal adapter circuit 1023 for transmission and reception of optical time signals over an optical cable. Exemplary embodiments of the electro-optical signal adapter module 1023 are shown by U.S. Pat. No. 6,941,077 issued to Aronson et al. on Sep. 6, 2005; and U.S. Pat. No. 7,215,891 issued to Chiang et al. on May 8, 2007, both of which are incorporated herein by reference. Exemplary embodiments of the mechanical aspects of the SFP module 359 are shown and described herein, as well as by U.S. Pat. No. 7,116,912 issued to Pang et al. on Oct. 3, 2006 incorporated herein by reference.

With the optical Ethernet SFP time signal adapter module 359, a serial optical time signal is transmitted over a fibre-over-Ethernet cable 160. The fibre-over-Ethernet cable 160 may include two fibre optical cables for bidirectional communication of optical signals. The cable 160 may have a pair of male optical connectors at each end. The male optical connector at one end of the cable 160 are inserted into the female optical connectors 424 of the SFP time signal adapter module 359. The optical input signal is coupled into the electro-optical signal converter circuit 1023 to convert optical signals into electrical signals. The serial optical time reference input signal is converted into a serial electrical time reference input signal. The serial electrical time reference input signal is coupled to the SFP edge connector 430. With the SFP time signal adapter module 359 plugged into the time port of the daughter card, the time reference input signal is coupled to the data packet processor for deserialization and decoding to extract the date and time information.

An electrical serial time output signal may be received by the module 359 from the data packet processor of the daughter card. The electrical serial time output signal may be coupled into the electro-optical signal converter circuit 1023 to covert a serial electrical input signal into a serial optical output signal. The electro-optical signal converter circuit 1023 coverts the electrical serial time output signal into an optical serial time output signal. The optical serial time output signal may then be coupled into an optical connector of the optical connectors 424. With an optical cable 160 plugged into the optical connector 424, the optical serial time output signal can be communicated back to the time reference generator over the optical cable.

Referring now to FIG. 10D, a block diagram of an electrical Ethernet SFP time signal adapter module 358 is shown. The electrical Ethernet SFP time signal adapter module 358 includes an Ethernet electrical signal adapter circuit 1025 mounted to a printed circuit board for transmission and reception of time signal packets over a wire Ethernet cable. Exemplary embodiments of the electrical signal adapter circuit 1025 are shown by U.S. Pat. No. 6,203,333 issued to Medina et al on Mar. 20, 2001; U.S. Pat. No. 8,419,444 issued to Kagan et al. on Apr. 16, 2013, both of which are incorporated herein by reference. Another exemplary embodiment of an electrical signal adapter circuit 1025 is a Vitesse Semiconductor Corporation media converter having part number VSC8211.

A time signal packet is communicated over a copper Ethernet cable 160' and received at the cable connector 426 of the module 358. The time signal packet includes date and time information that is broadcast from the time reference generator. The time signal packet may be depacketized by the Ethernet electrical signal adapter circuit 1025 with the date and time information in a serial time reference input signal being serially communicated to the SFP edge connector 430. The serial time reference input signal may then be communicated to the data packet processing circuit through the SFP male edge connector 430 being coupled to a SFP female edge connector on the daughter card.

One of a plurality of SFP time signal adapter modules is selected for coupling into the time signal port of a network coprocessing daughter card. The selected SFP time signal adapter may receive an optical time reference signal, an electrical time reference signal, or a packetized time reference signal. The SFP time signal adapter module that may be selected may be an electrical signal module such as a Fibre Channel over Ethernet SFP time signal adapter module, a differential digital SFP time signal adapter module, a modulated SFP time signal adapter module, or an Ethernet SFP time signal adapter module. The SFP time signal adapter module that may be selected may be an opto-electrical signal module that may be a Fibre Channel over Ethernet SFP time signal adapter module, or an Ethernet SFP time signal adapter module.

Reference is now made to FIGS. 5-9 illustrating the electro-mechanical aspects of the SFP time signal adapter modules.

Figure 5:
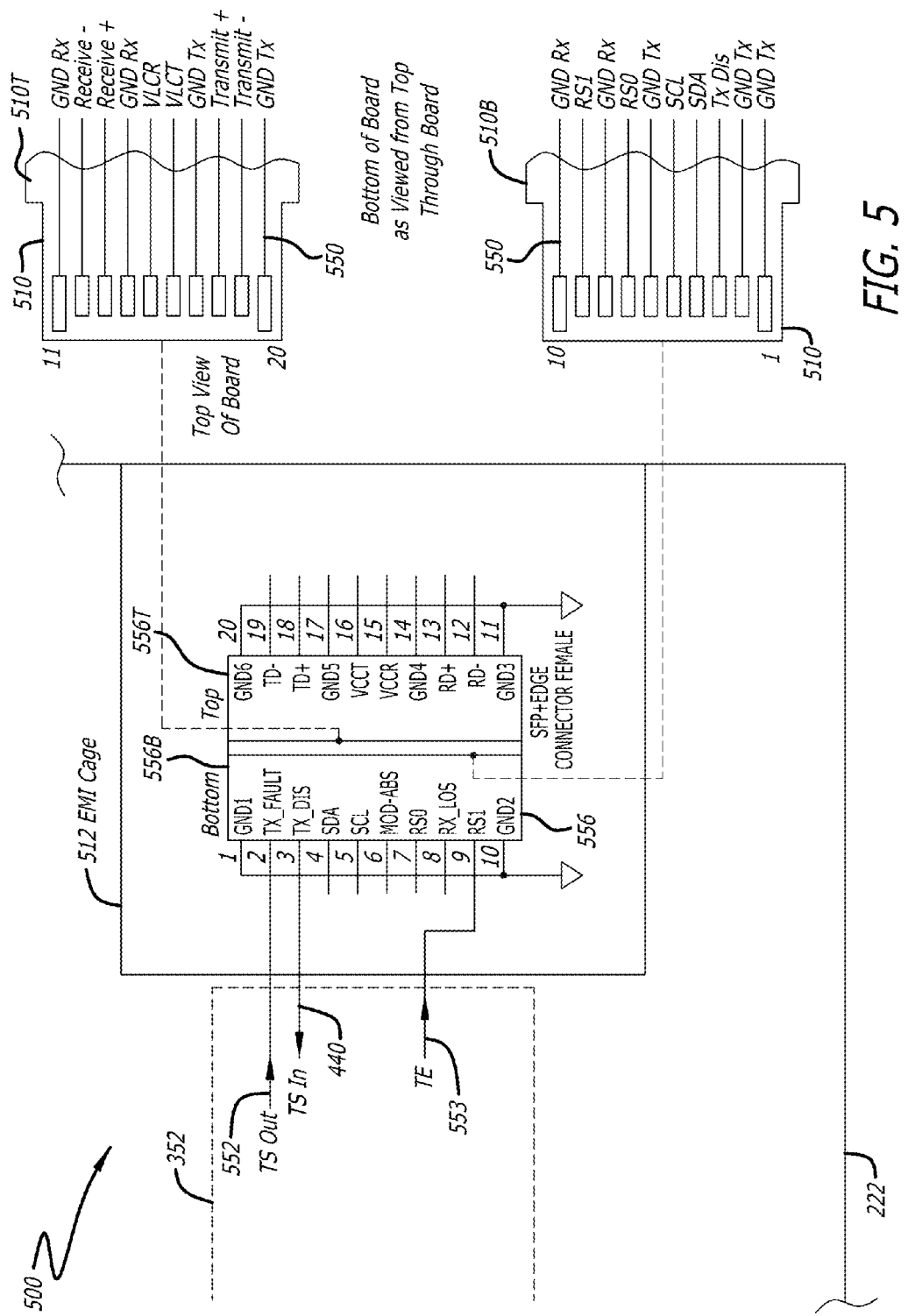
FIG. 5 is a schematic diagram of how a male SFP connector of the SFP time signal adapter couples a time reference signal to the female SFP socket of a daughter card and the integrated module mounted thereto.

In FIG. 5, a block diagram of the electromechanical connections made between the SFP female edge connector 556 and the SFP male connector 510 is illustrated. The SFP male edge connector 510 provides the electrical connection of the pins of the SFP edge connector 430 for the SFP time signal adapter modules shown in FIGS. 10A-10D.

The edge connector 510 includes ten pads numbering one through ten on a bottom portion 510B of the printed circuit board 500. The edge connector 510 further includes ten pads numbering from eleven through twenty on a top portion 510T of the printed circuit board 1500. The ten pads on the top portion 510T and the ten pads on bottom portion 510B are coupled to traces 550 of the printed circuit board of the SFP time signal adapter module.

As shown in FIG. 5, the daughter card 222 includes a time signal port including an SFP electromagnetic interference (EMI) cage 512 and an SFP female electrical connector 556 mounted to its printed circuit board. The SFP female electrical connector 556 is coupled to data packet processing circuit 352 on the daughter card through printed circuit board traces 440,552,553.

The SFP electrical connector 556 includes a top connector portion 556T and a bottom connector portion 556B. The top connector portion 556T has pins 12-20 to couple to pads 11-20 of the top portion 510T of the SFP male edge connector 510 of the SFP time signal adapter module. The bottom connector portion 556B has pins 1-10 to couple to pads 1-10 of the bottom 510B of the SFP male edge connector 510.

Figure 6:
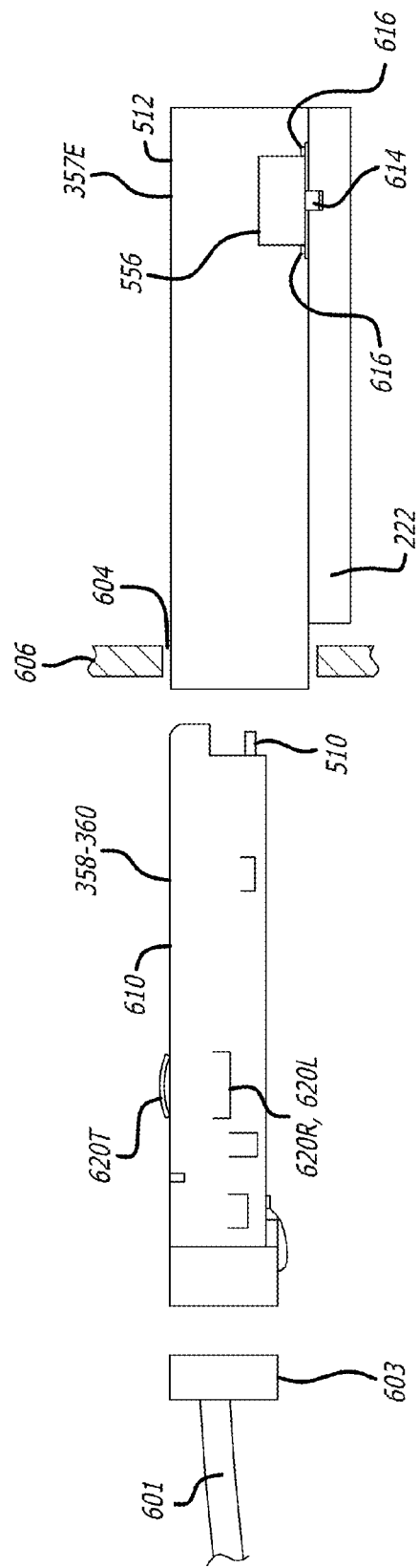
FIG. 6 is a side view of a serial differential cable, an SFP time signal adapter, and an SFP port of the daughter card being coupled together.

Referring now to FIG. 6, a side perspective view of an SFP time signal adapter module 358-360, Ethernet cable 601, and daughter card 222 are shown ready to be plugged together. The Ethernet cable 601 includes a male connector 603 to plug into the female connector of the SFP time signal adapter module 358-360. The SFP time signal adapter module 358-360 includes the male SFP edge connector 510 to plug into the female SFP connector 556 of the daughter card 222.

An opening of the EMI cage 512 aligns with an opening 604 in an adapter card bracket 606 of the daughter card 222. A shell 610 of the SFP time signal adapter module 358-360 includes protrusions 620T, 620R, 620L on top right and left sides that mate with the EMI cage 512 to provide EMI shielding.

Within the EMI cage 512, the SFP edge connector 510 of the SFP time signal adapter module 358-360 mates with the female SFP edge connector 556 that is mounted to the printed circuit board 222. The female SFP edge connector 556 has pins 616 on either side to couple to the traces of the printed circuit board 222 in order to make an electrical connection to the data packet processing circuit 352 of FIGS. 3A and 3B.

Figure 7:
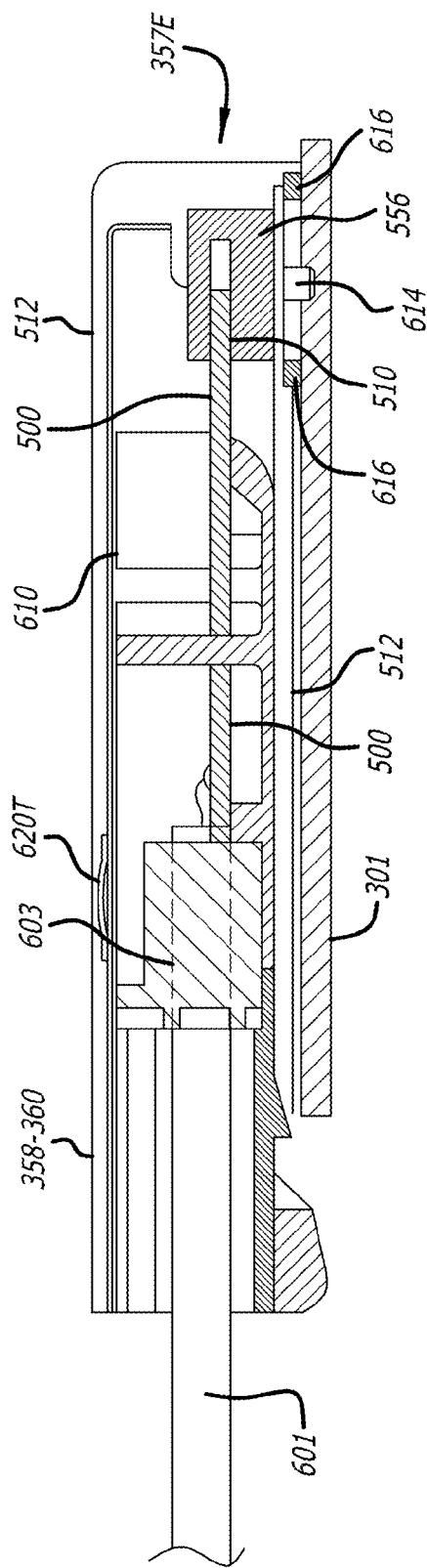
FIG. 7 is a cross-sectional side view of the serial differential cable, the SFP time signal adapter, and the SFP port of the high speed networking daughter card coupled together.

Referring now to FIG. 7, a side cross-sectional view of the, Ethernet cable 601, the SFP time signal adapter module 358-360 assembled together into the time signal port 357E is shown. The top protrusion 620 of the shell 610 is coupled to the EMI cage 512. The male SFP edge connector 510 of the printed circuit board 500 is coupled into the female SFP edge connector 556. The connector 603 of the Ethernet cable 601 is plugged into the female jack or connector of the SFP time signal adapter module 358-360.

Figure 8:
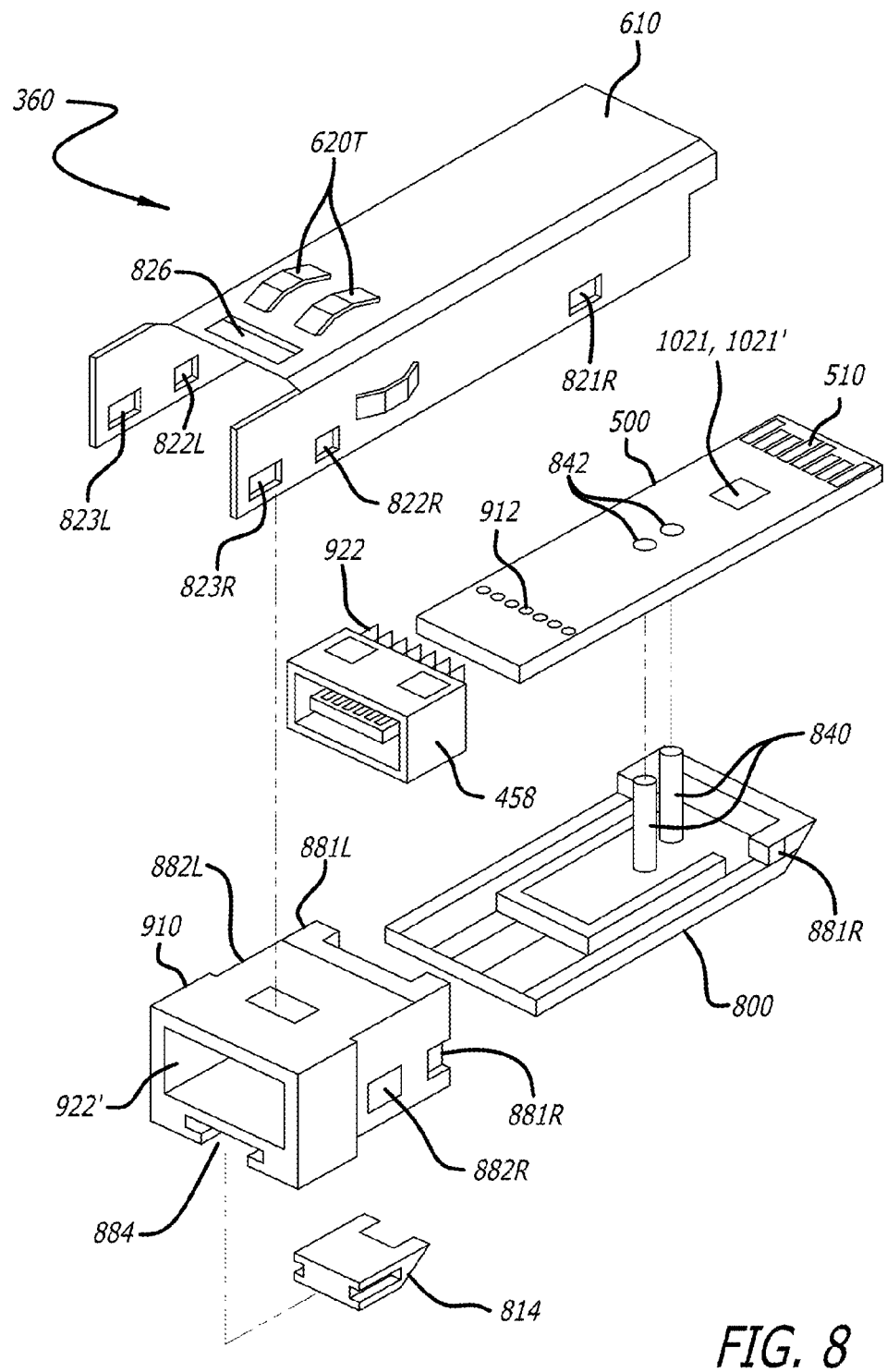
FIG. 8 is an exploded view of a SFP time signal adapter with a male SFP connector at one end and a serial differential cable connector at an opposite end to couple to a serial differential cable.

Referring now to FIG. 8, an exploded perspective view of an SFP time signal adapter module 360 is shown. The exploded view shows the differential receiver transmitter 1021,1021' mounted to the printed circuit board 500 between the male SFP edge connector 510 and the cable connector 458. The cable connector 458 includes pins 922 that are coupled to traces of the printed circuit board 500. The printed circuit board 500 includes pinholes 912 into which pins 922 of the connector 902 may be soldered. The pinholes 912 are coupled to printed circuit board traces.

A connector housing 910 provides an opening 922' through which a plug of an Ethernet cable may be inserted and coupled to the cable connector 458.

The SFP time signal adapter module includes a catch (not shown) that can interface with a latch of the EMI cage. The catch may be released by a release mechanism 814 that slides within an opening 884 so that the SFP time signal adapter module 360 may be released from the EMI cage 512.

The shell 610 of the SFP time signal adapter module 360 may be mounted to a base 800 around the connector housing 910. Left side openings 822L, 823L and right side openings 822R, 823R in the shell 610 mate with left side protrusions 881L, 882L and right side protrusions 881R, 882R in the base 800 and connector housing 910.

Figure 9:
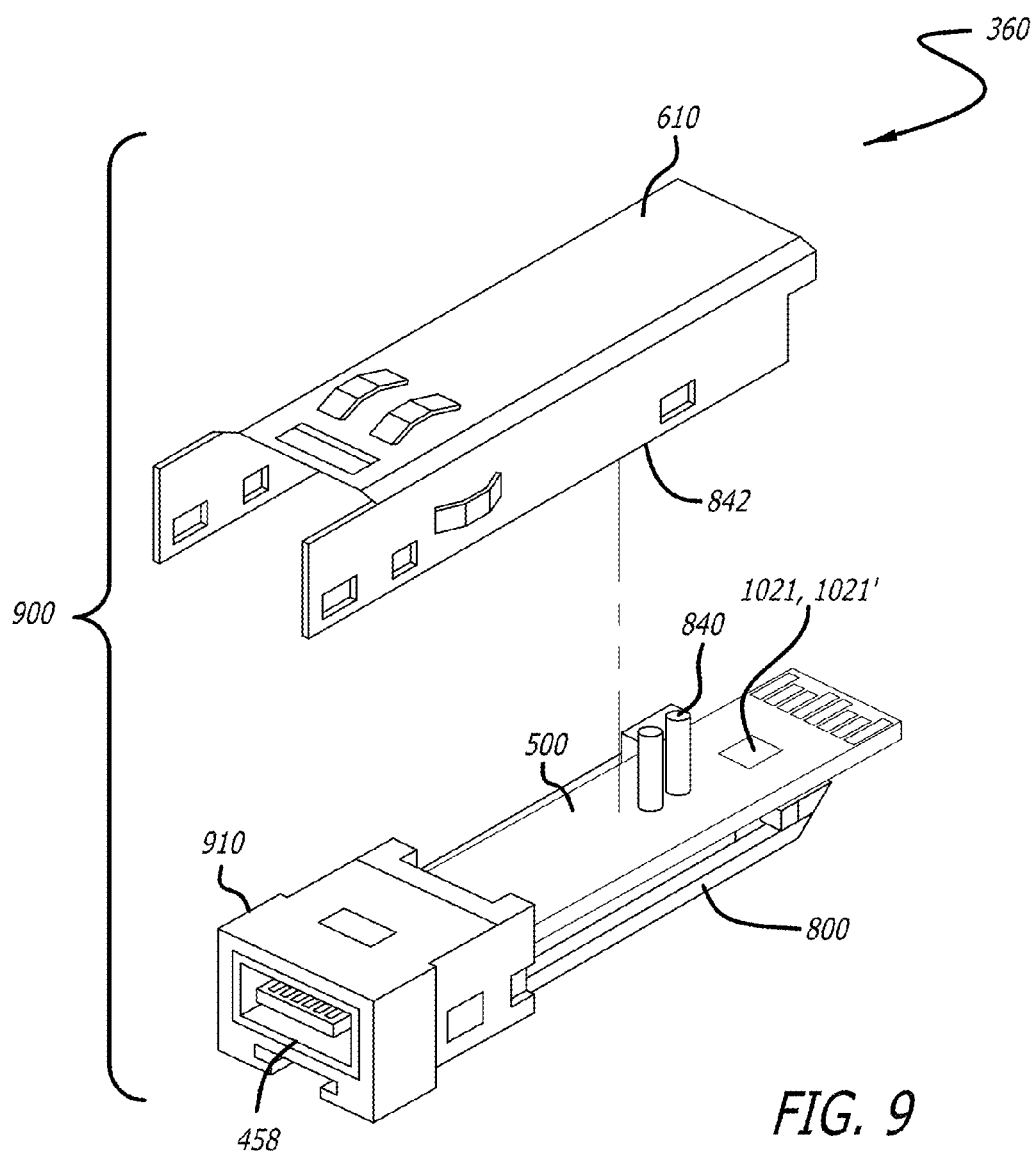
FIG. 9 is a perspective view of the SFP time signal adapter of FIG. 8 without the cover/housing assembled together.

FIG. 9 illustrates a substantial assembled view of the SFP time signal adapter module 360 without the shell 610 mounted to the base 800 and connector housing 910.

To assemble the components of the adapter 900 together, the base 800 includes a pair of posts 840 that may be received within openings 842 of the printed circuit board 500. After the posts 840 are inserted within the openings 842, the top of the posts may be deformed such as by being mushroomed out so that it retains the printed circuit board 500 coupled to the base.

Time Reference Signals

Referring now to FIG. 11A, an IRIG-B time reference signal 1100 is shown in waveform portions 1100A-1100B. The IRIG-B time reference signal consists of one hundred bits. In one embodiment, the one hundred bits of the IRIG-B time reference signal are generated every second by the timing reference generator. Seventy-four bits of the IRIG-B time reference signal contain various time, date, time changes and time quality information of the time signal. The IRIG-B time reference signal is a decimal or binary signal comprising logical ones, zeros and position identifier bits. The IRIG-B time reference signal provides a reliable means of transmitting time to networking equipment.

Generally, there are three functional groups of bits in the IRIG-B time signal including encoded date and time, control functions (CF) 1105, and straight binary seconds (SBS) 1109 of the day. Bits of the IRIG-B time signal may be encoded with a binary coded decimal (BCD) to represent the time-of-year (in days 1117, hours 1115, minutes 1113, seconds 1111), year 1119, straight binary seconds-of-day 1109, and control functions 1105. The binary coded decimal (BCD) group of bits contains time information including seconds, minutes, hours and days, recycling yearly. The BCD time-of-year code (BCDTOY) reads zero (0) hours, minutes, seconds, and fraction of seconds at 2400 each day and reads day 001 at 2400 of day 365, or day 366 in a leap year. The BCD year code (BCDYEAR) counts year and cycles to the next year on January 1st of each year and may count to year 2099.

An optional SBS time-of-day code 1109 comprises the total elapsed seconds, recycling daily. SBS code reads zero (0) seconds at 2400 each day excluding leap second days when a second may be added or subtracted.

The CF group of bits 1105 contains year, time quality, leap year, pending leap seconds and parity. Other CF bits 1105 are reserved for user-defined purposes, depending on application. For example, Daylight Saving Time (DST), and DST pending; local time offset; time quality; and parity may be other CF bits. Position identifiers 1107A-1107K in the IRIG-B time signal separate the various components of the IRIG-B time code.

Referring now to FIG. 11B, the IRIG-B time reference signal 1100 can be modulated (by a carrier signal or modulating signal) or unmodulated (no carrier signal) such as with a DC Level Shifted (DCLS) or binary signal. In FIG. 11B, a waveform 1110 illustrates an exemplary unmodulated or DC level shifted IRIG-B time signal. Waveform 1112 illustrates an exemplary amplitude modulated waveform that is responsive to the bits in the unmodulated IRIG-B time signal. Waveform 1114 illustrates an exemplary modulation clock signal that may be used to Manchester encode the unmodulated IRIG-B time signal into a waveform 1116, modified Manchester encoded time signal.

The IRIG-B time reference signal can be transmitted over optical cables, shielded twisted pair wire cables, or coaxial cables. Alternatively, a time reference signal may be packetized into an Ethernet packet with the Ethernet packet being transmitted over cables to the networking equipment in the local area network.

Figure 12:
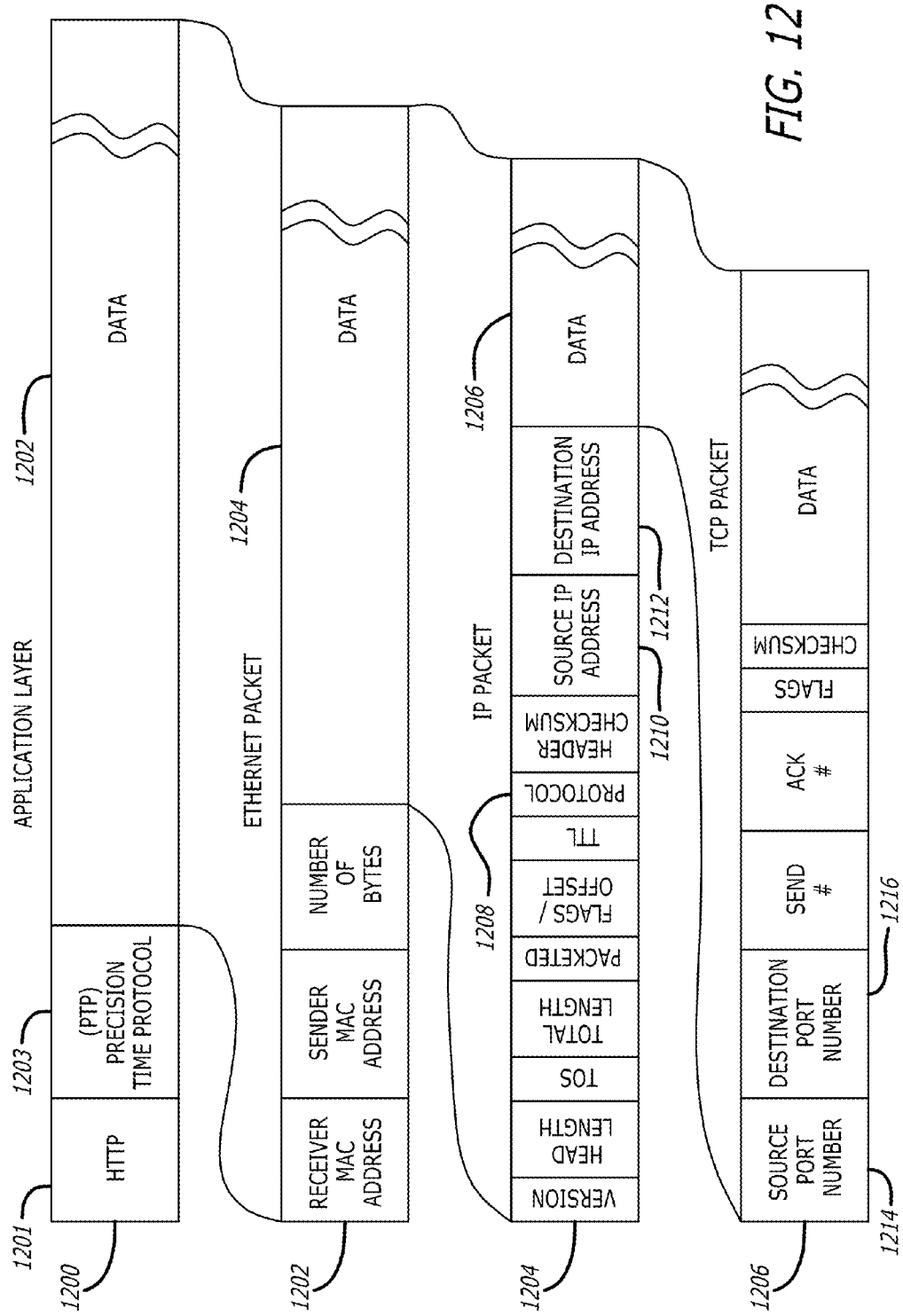
FIG. 12 is a diagram of an Ethernet packet to illustrate how a time reference signal is embedded in a packet for optical signal transmission over an optical fibre and electrical signal transmission over Ethernet.

Referring now to FIG. 12, a frame 1200 for an Ethernet time packet 1202 is shown. The frame 1200 includes a transport protocol 1201, timing element, and a precision time protocol (PTP) 1203, that time stamps or associates time with the Ethernet packet 1202. The association of the precision time protocol with the Ethernet packet provides accurate synchronization between resources in the communication of the data contained within the Ethernet time packet.

The Ethernet time packet 1202 further includes a header field and a data field. The header field of the Ethernet time packet 1202 includes a destination or receiver media access control (MAC) address, a source or sender MAC address, and a field of a number of bytes of optional header information.

The data field of the Ethernet time packet 1202 includes an IP packet 1204, which includes a header field and a data field. The header field of the IP packet 1204 includes a version field, a header length field, a type of service (ToS) field, a total length field, a packet identifier, a time to live (TTL) field, a protocol field 1208, a header checksum, a source IP address 1210, and a destination IP address 1212.

The data field of the IP packet 1204 may include a transmission control protocol (TCP) packet, a user datagram protocol (UDP) packet, or a stream control transmission protocol (SCTP) packet. FIG. 12 illustrates a transmission control protocol (TCP) packet 1206 including a header field and a data field. The header field of the TCP packet 1206 includes a source port number 1214, a destination port number 1216, a send number, an acknowledgement number, one or more flags, and a checksum.

The embodiments are thus described. While this specification and the drawing figures include many specific aspects, these should not be construed as limitations on the scope of the disclosure or of what may be claimed, but rather as descriptions of aspects specific to particular implementations. Certain aspects that are described in this specification in the context of separate implementations may also be implemented in combination in a single implementation. Conversely, various aspects that are described in the context of a single implementation may also be implemented in multiple implementations, separately or in sub-combination. Moreover, although aspects may be described above as acting in certain combinations and even initially claimed as such, one or more aspects from a claimed combination may in some cases be excised from the combination, and the claimed combination may be directed to a sub-combination or variations of a sub-combination. Moreover, various modifications to the aspects and embodiments described herein may be determined by those of ordinarily skilled in the art after reading this disclosure. Accordingly, the claims should not be construed as limited by such described embodiments, but rather construed according to the claim limitations that follow below.

What is claimed is:

1. A method for a network appliance, comprising:
providing a network coprocessing card having a coprocessor and a plurality of small form-factor pluggable (SFP) ports, each of the SFP ports having an SFP electro-magnetic interference (EMI) cage and an SFP connector coupled to the coprocessor, wherein one of the plurality of SFP ports of the network coprocessing card is a time signal port to receive a time reference signal;
coupling the network coprocessing card with a mother board of the network appliance to couple the coprocessor in communication with a processor and memory of the mother board;
configuring the coprocessor of the network coprocessing card to receive the time reference signal and network data;
selecting an SFP time signal adapter module of a plurality of SFP time signal adapter modules to communicate with a time reference signal generator; and
coupling the selected SFP time signal adapter module with the time signal port of the network coprocessing card to receive the time reference signal.

2. The method of claim 1, wherein
the selected SFP time signal adapter module is an electrical signal module selected from the set of SFP time signal adapter modules comprising
Fibre Channel over Ethernet SFP time signal adapter module, a differential digital SFP time signal adapter module, a modulated SFP time signal adapter module, and Ethernet SFP time signal adapter module.

3. The method of claim 1, wherein
the selected SFP time signal adapter module is an opto-electrical signal module selected from the set comprising
Fibre Channel over Ethernet SFP time signal adapter module, and Ethernet SFP time signal adapter module.

4. The method of claim 1, further comprising:
selecting to receive an external time reference signal and not an internal time reference signal.

5. The method of claim 4, wherein
the coprocessor of the network coprocessing card is configured by setting bits of a configuration register to selectively receive an internal time signal or an external time signal; and
the external time reference signal is selected by one of the bits of the configuration register.

6. The method of claim 1, further comprising:
depacketizing a time reference signal from a time signal packet;
extracting date and time information from the time signal packet; and
associating the date and time information with data from a data signal packet.

7. The method of claim 1, further comprising:
converting a differential serial time reference signal into a single ended serial time reference signal.

8. The method of claim 1, further comprising:
prior to converting the differential serial time reference signal, clamping a signal on each differential signal line over which the differential serial time reference signal is communicated.

9. The method of claim 8, further comprising:
prior to converting the differential serial time reference signal, filtering out high frequency noise of the signal on each differential signal line over which the differential serial time reference signal is communicated.

10. A small form-factor pluggable (SFP) time signal adapter module, the SFP time signal adapter module comprising:
a printed circuit board having a plurality of wire traces and a plurality of pads of an SFP edge connector;
a cable connector mounted to the printed circuit board and coupled to one or more of the plurality of wire traces, the cable connector to receive a connector of a cable with a differential time signal; and
a differential receiver coupled to the cable connector, one or more of the plurality of wire traces, and the SFP edge connector, the differential receiver to receive and differentiate the differential time input signal to generate a time input signal coupled to at least one pad of the SFP edge connector.

11. The SFP time signal adapter module of claim 10, further comprising:
a differential driver coupled to the cable connector, one or more of the plurality of wire traces, and the SFP edge connector, the differential driver to receive a time output signal from a second pad of the SFP edge connector and convert the time output signal into a differential time output signal coupled to the cable connector.

12. The SFP time signal adapter module of claim 11, wherein the time input signal is a modulated signal and the module further comprises:
a first mixer coupled between an output of the differential receiver and a pad of the SFP edge connector;
a local demodulating clock coupled to the first mixer, the local demodulating clock to generate a demodulation signal of similar frequency to that used to generate the modulated time input signal;
a second mixer coupled between an input of the differential driver and another pad of the SFP edge connector;
a local modulating clock coupled to the second mixer, the local modulating clock to generate a modulation signal of a modulation frequency,
wherein the second mixer receives and modulates a time output signal into a modulated time output signal in response to the modulation signal;
wherein the first mixer demodulates the modulated time signal into the demodulated time signal in response to the demodulation signal.

13. The SFP time signal adapter module of claim 10, further comprising:
a plurality of filters coupled between the differential receiver and the cable connector to filter noise out of the differential time input signal.

14. The SFP time signal adapter module of claim 10, further comprising:
a plurality of protection devices coupled between the differential receiver and the cable connector to protect the differential receiver from voltages exceeding an upper power supply voltage and a lower power supply voltage.

15. The SFP time signal adapter module of claim 14, wherein
each of the plurality of protection devices includes
a first zener diode and a second zener diode coupled back to back with a terminal coupled together and to a trace of the printed circuit board, the first zener diode having another terminal coupled to a positive power supply, and the second zener diode having another terminal coupled to a negative power supply.

16. The SFP time signal adapter module of claim 10, wherein
the cable connector is a female Ethernet (RJ-45) connector.

17. The SFP time signal adapter module of claim 10, wherein
the differential time signal is a double ended signal; and
the time input signal is a single ended signal.

18. The SFP time signal adapter module of claim 10, further comprising:
a first input protection resistor coupled between a first input terminal of the differential receiver and a lower level power supply terminal;
a second input protection resistor coupled between a second input terminal of the differential receiver and the lower level power supply terminal; and
a terminating resistor coupled in series with a switch, the switch selectively coupling the terminating resistor between the first and second input terminals of the differential receiver.

19. The SFP time signal adapter module of claim 10, wherein the time input signal is a modulated signal and the module further comprises:
a first mixer coupled between an output of the differential receiver and a pad of the SFP edge connector;
a local demodulating clock coupled to the first mixer, the local demodulating clock to generate a demodulation signal of similar frequency to that used to generate the modulated time input signal;
wherein the first mixer demodulates the modulated time signal into the demodulated time signal in response to the demodulation signal.

* * * * *